US011265533B2

(12) United States Patent
Makiguchi et al.

(10) Patent No.: US 11,265,533 B2
(45) Date of Patent: Mar. 1, 2022

(54) IMAGE GENERATION APPARATUS, IMAGE GENERATION METHOD, AND PROGRAM

(71) Applicant: NIPPON TELEGRAPH AND TELEPHONE CORPORATION, Tokyo (JP)

(72) Inventors: Motohiro Makiguchi, Tokyo (JP); Hideaki Takada, Tokyo (JP); Taiki Fukiage, Tokyo (JP); Shinya Nishida, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/047,627

(22) PCT Filed: Apr. 3, 2019

(86) PCT No.: PCT/JP2019/014774
§ 371 (c)(1),
(2) Date: Oct. 14, 2020

(87) PCT Pub. No.: WO2019/202986
PCT Pub. Date: Oct. 24, 2019

(65) Prior Publication Data
US 2021/0112237 A1    Apr. 15, 2021

(30) Foreign Application Priority Data
Apr. 16, 2018    (JP) .............................. JP2018-078327

(51) Int. Cl.
*H04N 13/282*        (2018.01)
*H04N 13/111*        (2018.01)

(52) U.S. Cl.
CPC ......... *H04N 13/282* (2018.05); *H04N 13/111* (2018.05)

(58) Field of Classification Search
CPC .. H04N 13/282; H04N 13/111; H04N 13/268; G06T 15/20; G06T 19/00
(Continued)

(56) References Cited

U.S. PATENT DOCUMENTS

| 8,106,949 | B2 * | 1/2012 | Tan ...................... H04N 9/3185 348/180 |
| 2013/0300828 | A1 * | 11/2013 | Yamato .................. H04N 13/30 348/44 |

FOREIGN PATENT DOCUMENTS

JP    201856983    4/2018

OTHER PUBLICATIONS

Jones, Andrew, et al., "An Automultiscopic Projector Array for Interactive Digital Humans," SIGGRAPH 2015 Emerging Technologies, Aug. 9-13, 2015, ACM 978-1-4503-3635-Feb. 15, 2008.
(Continued)

*Primary Examiner* — Tung T Vo

(57) ABSTRACT

Provided is an image generation technology capable of suppressing unpleasant feelings caused by fluctuation in image quality caused by the viewer's viewpoint movement. The image generation technology includes an image generation unit configured to generate a pseudo viewpoint image $I_{\varphi k}$ and a pseudo viewpoint image $I_{-\varphi k}$, by using disparity inducing edge $D_{\varphi k}$ having a phase difference $\varphi k$ from a viewpoint image I, where $\varphi k (1 \leq k \leq K)$ is set as a real number satisfying $0 < \varphi 1 < \ldots < \varphi K \leq \pi/2$, an output image generation unit configured to generate an output image $Out_m (1 \leq m \leq 2K-1)$, from the pseudo viewpoint image $I^{(m)}$ $(1 \leq m \leq 2K+1)$, the viewpoint image I is set as a pseudo viewpoint image $I_{\varphi 0}$, where the pseudo viewpoint images $I_{\varphi k}, I_{-\varphi k}$ $(0 \leq k \leq K)$ are arranged in a sequence of $I_{\varphi k}, I_{\varphi (K-1)}, \ldots, I_{\varphi 1}, I_{\varphi 0}(=I), I_{-\varphi 1}, \ldots,$ and $I_{-\varphi K}$ is set as $I^{(1)}, I^{(2)}, \ldots, I^{(K)}, I^{(K+1)}, I^{(K+2)}, \ldots, I^{(2K+1)}$, and the output image $Out_m$ and the output image $Out_{m+1} (1 \leq m \leq 2K-2)$ include a (Continued)

phase modulation component that is canceled out when synthesized and visually recognized.

20 Claims, 17 Drawing Sheets

(58) Field of Classification Search
USPC .......................................................... 348/46
See application file for complete search history.

(56) References Cited

OTHER PUBLICATIONS

Takada, Hideaki, et al., "Smooth Motion Parallax with Fewer Projectors Realizing Viewpoint Movable Unaided 3D Video Screen," Jul. 28, 2017, Video Information Media Society Technical Report, ITE Technical Report, vol. 41, No. 24, IDY2017-34.

* cited by examiner

IMAGE GENERATION APPARATUS, IMAGE GENERATION METHOD, AND PROGRAM

CROSS-REFERENCE TO RELATED APPLICATIONS

This application is a U.S. 371 Application of International Patent Application No. PCT/JP2019/014774, filed on 3 Apr. 2019, which application claims priority to and the benefit of JP Application No. 2018-078327, filed on 16 Apr. 2018, the disclosures of which are hereby incorporated herein by reference in their entireties.

TECHNICAL FIELD

The present disclosure relates to an image generation technology, and particularly to an image generation technology for a viewer to perceive an image from a viewpoint located at an intermediate position between adjacent viewpoints.

BACKGROUND ART

A technology described in Non-Patent Literature 1, for example, for synthesizing luminance of the images (viewpoint images) from adjacent viewpoints smoothly based on the position of an intermediate viewpoint between the adjacent viewpoints (intermediate viewpoint position), and enabling a viewer to perceive an image from an intermediate viewpoint, is called "linear blending".

The linear blending is advantageously used to reduce the number of projectors required for image display, because there is no need to prepare the image from the intermediate viewpoint position. In other words, the cost associated with image display can be reduced.

CITATION LIST

Non Patent Literature

Non-Patent Literature 1: Andrew Jones, Jonas Unger, Koki Nagano, Jay Busch, Xueming Yu, Hsuan-Yueh Peng, Oleg Alexander, Mark Bolas, Paul Debevec, "An Automultiscopic Projector Array for Interactive Digital Humans", SIGGRAPH' 15, ACM SIGGRAPH 2015 Emerging Technologies Article No. 6, 2015.

SUMMARY OF THE INVENTION

Technical Problem

However, with the current linear blending, image quality may be degraded due to image multiplexing caused by overlapping images at the intermediate viewpoint position. In addition, while images at adjacent viewpoints that correspond to the positions of the projectors show no degradation in quality, images at the intermediate viewpoint positions show degradation in quality. When a viewer moves its viewpoint, a fluctuation in image quality occurs, causing the viewer to experience unpleasant feelings.

A description will be made with reference to FIG. 1. At a viewpoint A, a viewer visually recognizes only single viewpoint image (image 1) and therefore experiences a good image quality. However, at a viewpoint B, which is the intermediate viewpoint position, the viewer visually recognizes an image that is synthesized (visible at the same time) from the two viewpoint images (image 1 and image 2) and thus experiences a poor image quality due to overlapping. As a result, when the viewer moves in a sequence of A→B→C, the image quality fluctuates from good→poor→good.

Thus, an object of the present disclosure is to provide an image generation technology capable of suppressing unpleasant feelings associated with fluctuation in image quality caused by the viewer's viewpoint movement.

Means for Solving the Problem

An aspect of the present disclosure includes: an image generation unit configured to generate, from a viewpoint image I and a disparity map Dmap corresponding to the viewpoint image I, a disparity inducing edge $D_{\varphi k}$ having a phase difference $\varphi k$ from the viewpoint image I for $k=1, \ldots, K$, generate a pseudo viewpoint image $I_{\varphi k}$, by adding the disparity inducing edge $D_{\varphi k}$ to the viewpoint image I, and generate a pseudo viewpoint image $I_{-\varphi k}$ by adding a polarity-inversed image of the disparity inducing edge $D_{\varphi k}$ to the viewpoint image I, where K is an integer of one or more, and $\varphi k (1 \leq k \leq K)$ is a real number satisfying $0 < \varphi 1 < \ldots < \varphi K \leq \pi/2$; and an output image generation unit configured to generate an output image $Out_m$ ($1 \leq m \leq 2K-1$) from the pseudo viewpoint image $I^{(m)}$ ($1 \leq m \leq 2K+1$), where the viewpoint image I is set as the pseudo viewpoint image $I_{\varphi 0}$, and the pseudo viewpoint images $I_{\varphi k}$ and $I_{-\varphi k}$ ($0 \leq k \leq K$) being arranged in a sequence of $I_{\varphi K}, I_{\varphi(K-1)}, \ldots, I_{\varphi 1}, I_{\varphi 0} (=I), I_{-\varphi 1}, \ldots,$ and $I_{-\varphi K}$ are set as $I^{(1)}, I^{(2)}, \ldots, I^{(K)}, I^{(K+1)}, I^{(K+2)}, \ldots,$ and $I^{(2K+1)}$;

wherein the output image $Out_m$ and output image $Out_{m+1}$ ($1 \leq m \leq 2K-2$) include a phase modulation component that is canceled out when synthesized and visually recognized.

Another aspect of the present disclosure includes: an image generation unit configured to generate, from a viewpoint image I and a viewpoint image I' captured from a viewpoint position adjacent to a viewpoint position at which the viewpoint image I is captured, a disparity inducing edge $D_{\varphi k}$ having a phase difference $\varphi k$ from the viewpoint image I for $k=1, K$, generate a pseudo viewpoint image $I_{\varphi k}$, by adding the disparity inducing edge $D_{\varphi k}$ to the viewpoint image I, and generate a pseudo viewpoint image $I_{-\varphi k}$ by adding a polarity-inversed image of the disparity inducing edge $D_{\varphi k}$ to the viewpoint image I, where K is an integer of one or more, and $\varphi k (1 \leq k \leq K)$ is a real number satisfying $0 < \varphi 1 < \ldots < \varphi K \leq \pi/2$; and an output image generation unit configured to generate an output image $Out_m$ ($1 \leq m \leq 2K-1$) from the pseudo viewpoint image $I^{(m)}$ ($1 \leq m \leq 2K+1$), where the viewpoint image I is set as a pseudo viewpoint image $I_{\varphi 0}$, and the pseudo viewpoint images $I_{\varphi k}$ and $I_{-\varphi k}$ ($0 \leq k \leq K$) being arranged in a sequence of $I_{\varphi K}, I_{\varphi(K-1)}, I_{\varphi 1}, I_{\varphi 0} (=I), I_{-\varphi 1}, \ldots,$ and $I_{-\varphi K}$ are defined as $I^{(1)}, I^{(2)}, \ldots, I^{(K)}, I^{(K+1)}, I^{(K+2)}$ and $I^{(2K+1)}$;

wherein the output image $Out_m$ and output image $Out_{m+1}$ ($1 \leq m \leq 2K-2$) include a phase modulation component that is canceled out when synthesized and visually recognized.

Another aspect of the present disclosure includes: an output image generation unit configured to generate an output image $Out_m$ ($1 \leq m \leq M-1$) from a viewpoint image $I^{(m)}$ and a disparity map $Dmap^{(m)}$ ($1 \leq m \leq M$), where $I^{(1)}, I^{(2)}, \ldots, I^{(M)}$ are set as viewpoint images arranged in a sequence of viewpoint positions, and $Dmap^{(m)}$ ($1 \leq m \leq M$) is set as a disparity map corresponding to the viewpoint image $I^{(m)}$, wherein the output image $Out_m$ and output image $Out_{m+1}$ ($1 \leq m \leq M-2$) include a phase modulation component that is canceled out when synthesized and visually recognized.

Another aspect of the present disclosure includes: an output image generation unit configured to generate an output image $Out_m$ ($1 \leq m \leq M-1$) from a viewpoint image $I^{(m)}$ ($1 \leq m \leq M+1$), where $I^{(1)}, I^{(2)}, \ldots, I^{(M)}$ are set as viewpoint images arranged in a sequence of viewpoint positions, wherein the output image $Out_m$ and output image $Out_{m+1}$ ($1 \leq m \leq M-2$) include a phase modulation component that is canceled out when synthesized and visually recognized.

Another aspect of the present disclosure includes: an output image generation unit configured to generate an output image $Out_j$ ($1 \leq j \leq J-1$) from a viewpoint image IO) ($1 \leq j \leq 2J+1$), where $I^{(1)}, I^{(2)}, \ldots, I^{(2J+1)}$ are set as viewpoint images arranged in a sequence of viewpoint positions, wherein the output image $Out_j$ and output image $Out_{j+1}$ ($1 \leq j \leq J-2$) include a phase modulation component that is canceled out when synthesized and visually recognized.

Another aspect of the present disclosure includes: an image generation unit configured to, from a viewpoint image I and a disparity map Dmap corresponding to the viewpoint image I, generate a disparity inducing edge $D_{\varphi k}$ having a phase difference φk from the viewpoint image I for k=1, . . . . K, generate a pseudo viewpoint image $I_{\varphi k}$, by adding the disparity inducing edge $D_{\varphi k}$ to the viewpoint image I, and generate a pseudo viewpoint image $I_{-\varphi k}$ by adding a polarity-inversed image of the disparity inducing edge $D_{\varphi k}$ to the viewpoint image I, where K is an integer of one or more, and φk($1 \leq k \leq K$) is a real number satisfying $0 < \varphi 1 < \ldots < \varphi K \leq \pi/2$,
wherein the viewpoint image I is set as a pseudo viewpoint image $I_{\varphi 0}$, and for k=-K, -(K-1), . . . , -1, 0, 1, . . . , K-1, a pseudo viewpoint image $I_{\varphi k}$ and a pseudo viewpoint image $I_{\varphi(k+1)}$ are viewpoint images at viewpoint positions adjacent to each other, and are images used for presenting an image obtained by synthesizing luminance of at least two images of the pseudo viewpoint image $I_{\varphi k}$ and the pseudo viewpoint image $I_{\varphi(k+1)}$ as an image at a viewpoint located at an intermediate position between the viewpoint positions adjacent to each other.

Another aspect of the present disclosure includes: an image generation unit configured to generate, from a viewpoint image I and a viewpoint image I' captured from a viewpoint position adjacent to a viewpoint position at which the viewpoint image I is captured, a disparity inducing edge $D_{\varphi k}$ having a phase difference φk from the viewpoint image I for k=1, . . . , K, generate a pseudo viewpoint image $I_{\varphi k}$, by adding the disparity inducing edge $D_{\varphi k}$ to the viewpoint image I, and generate a pseudo viewpoint image $I_{-\varphi k}$ by adding a polarity-inversed image of the disparity inducing edge $D_{\varphi k}$ to the viewpoint image I, where K is an integer of one or more, and φk($1 \leq k \leq K$) is a real number satisfying $0 < \varphi 1 < \ldots < \varphi K \leq \pi/2$,
wherein the viewpoint image I is set as a pseudo viewpoint image $I_{\varphi 0}$, and, for k=-K, -(K-1), . . . , -1, 0, 1, . . . , K-1, the pseudo viewpoint image $I_{\varphi k}$ and the pseudo viewpoint image $I_{\varphi(k+1)}$ are viewpoint images in viewpoint positions adjacent to each other, and are images used for presenting an image obtained by synthesizing luminance of at least two images of the pseudo viewpoint image $I_{\varphi k}$ and the pseudo viewpoint image $I_{\varphi(k+1)}$ as an image at a viewpoint located at an intermediate position between the viewpoint positions adjacent to each other.

Effects of Invention

According to the present disclosure, it is possible to suppress unpleasant feelings associated with fluctuation in image quality caused by the viewer's viewpoint movement.

DESCRIPTION OF EMBODIMENTS

Figure 1:
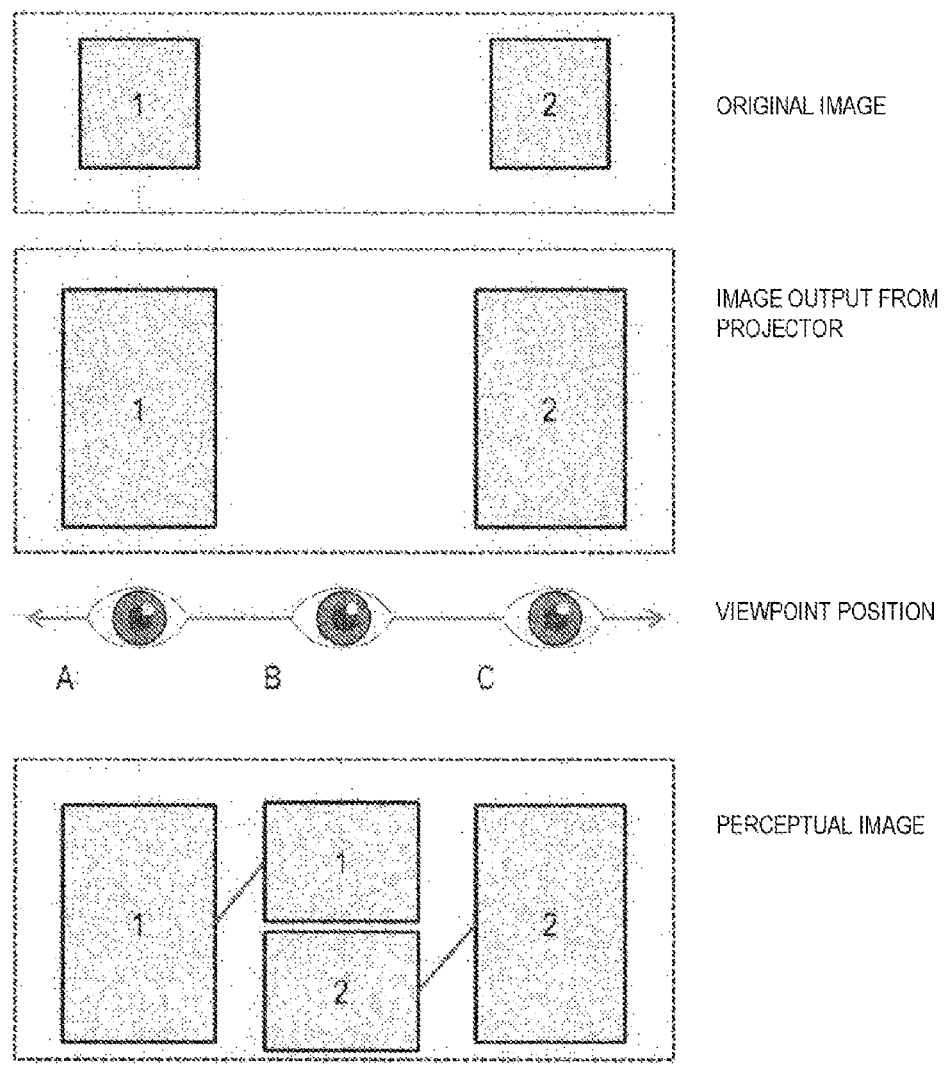
FIG. 1 is a diagram illustrating a related art (linear blending).

Embodiments of the present disclosure will be described in detail below with reference to the drawings. Note that components having the same function are given the same reference numerals, and redundant descriptions are omitted.

First Embodiment

Figure 2:
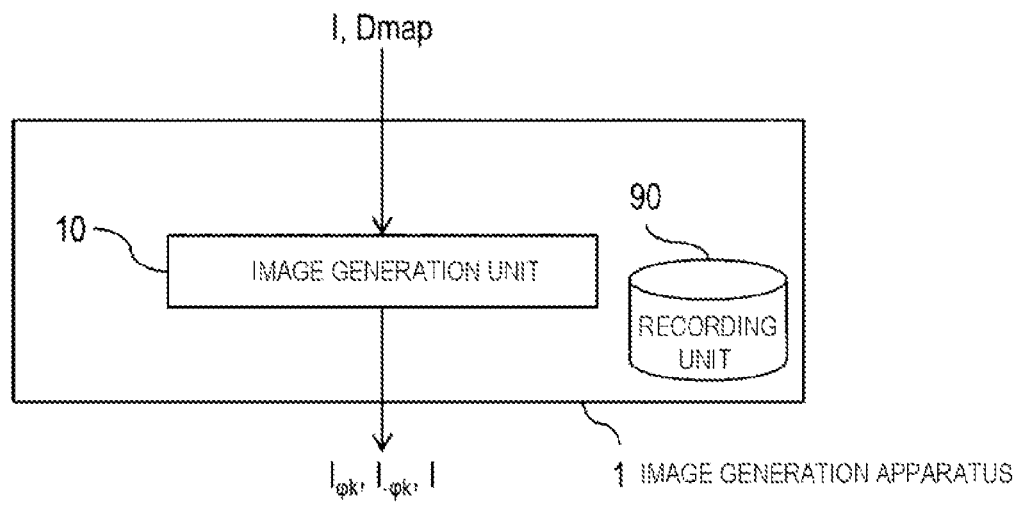
FIG. 2 is a block diagram illustrating a configuration of an image generation apparatus 1.
Figure 3:
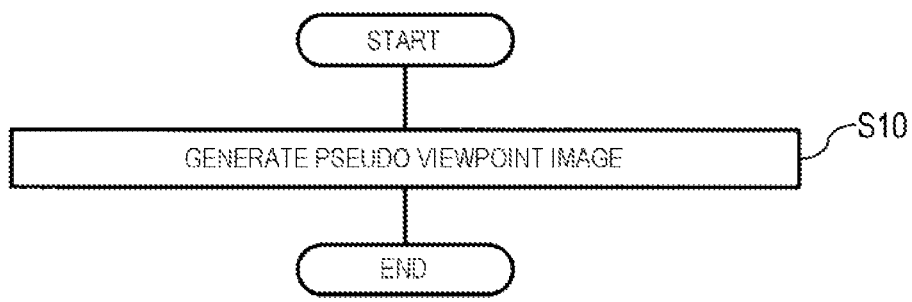
FIG. 3 is a flowchart illustrating an operation of the image generation apparatus 1.

Hereinafter, an image generation apparatus 1 will be described with reference to FIG. 2 and FIG. 3. FIG. 2 is a block diagram illustrating a configuration of the image generation apparatus 1. FIG. 3 is a flowchart illustrating operations of the image generation apparatus 1. As illustrated in FIG. 2, the image generation apparatus 1 includes an image generation unit 10 and a recording unit 90. The recording unit 90 is a component configured to appropriately record information required for processing of the image generation apparatus 1.

Figure 5:
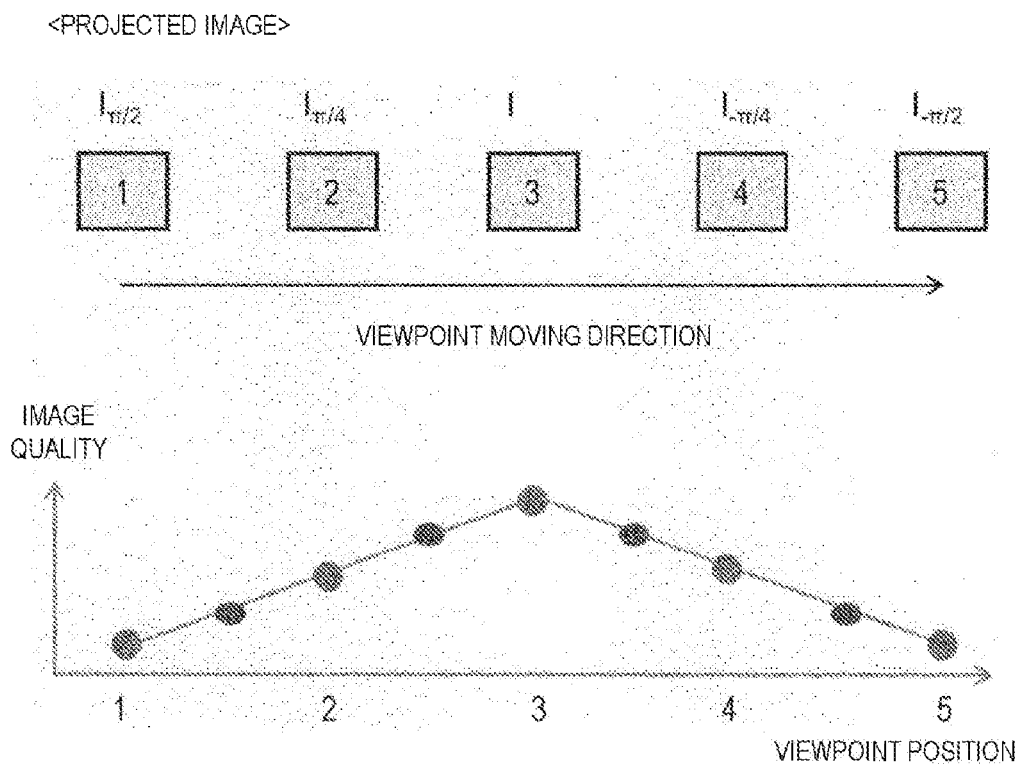
FIG. 5 is a diagram illustrating a state of fluctuation in image quality associated with the viewpoint movement.

The image generation apparatus 1 receives, as an input, the viewpoint image I and a disparity map Dmap corresponding to the viewpoint image I, generates 2K pseudo viewpoint images (K is an integer of 1 or greater), $I_{\varphi k}$, $I_{-\varphi k}$ ($1 \le k \le K$) from the viewpoint image I and the disparity map Dmap, and outputs the pseudo viewpoint images $I_{\varphi k}$, $I_{-\varphi k}$ ($1 \le k \le K$) and the viewpoint image I. Here, $\varphi k(1 \le k \le K)$ represents a phase difference between the viewpoint image I and the disparity inducing edge $D_{\varphi k}$, and is a real number satisfying $0 < \varphi 1 < \ldots < \varphi K \le \pi/2$. The disparity inducing edge $D_{\varphi k}$ is an image obtained by modulating a phase to make a phase difference from the viewpoint image I to be $\varphi k$. Further, the pseudo viewpoint image $I_{\varphi k}$, $I_{-\varphi k}$ are images both at the viewpoint positions different from the viewpoint position of the viewpoint image I (see FIG. 5). In the following, it is presented that $\varphi 0 = 0$, $I_{\varphi 0} = I$, and the viewpoint image I may be referred to as a pseudo viewpoint image $I_{\varphi 0}$.

Note that the disparity in the disparity map Dmap corresponding to the viewpoint image I may not be a disparity obtained at the viewpoint position where the viewpoint image I is captured. For example, the desired disparity may be used.

The operation of the image generation apparatus 1 will be described in accordance with FIG. 3.

In step S10, the image generation unit 10 receives, as an input, the viewpoint image I and a disparity map Dmap of the viewpoint image I, generates pseudo viewpoint image $I_{\varphi k}$, $I_{-\varphi k}$, from the viewpoint image I and the disparity map Dmap for $k=1, \ldots, K$, and outputs the pseudo viewpoint images $I_{\varphi k}$, $I_{-\varphi k}$ ($1 \le k \le K$) and the viewpoint image I. A procedure for generating the pseudo viewpoint images $I_{\varphi k}$, $I_{-\varphi k}$ will be described. First, the image generation unit 10 generates a disparity inducing edge $D_{\varphi k}$, which is a phase modulated image having a phase difference $\varphi k$ from the viewpoint image I, from the viewpoint image I and the disparity map Dmap. Next, the image generation unit 10 generates a pseudo viewpoint image $I_{\varphi k}$ by adding the disparity inducing edge $D_{\varphi k}$ to the viewpoint image I ($I_{\varphi k}=I+D_{\varphi k}$), and generates a pseudo viewpoint image $I_{-\varphi k}$ by adding the polarity-inversed image of the disparity inducing edge $D_{\varphi k}$ to the viewpoint image I ($I_{-\varphi k}=I-D_{\varphi k}$). The image generation unit 10 sequentially generates the pseudo viewpoint images $I_{\varphi k}$, $I_{-\varphi k}$ ($1 \le k \le K$).

Note that the image generation apparatus 1 may further include a projection unit (not illustrated) that projects the pseudo viewpoint images $I_{\varphi k}$, $I_{-\varphi k}$ ($1 \le k \le K$) and the viewpoint image I which are output at S10. The projection unit arranges the pseudo viewpoint images $I_{\varphi k}$, $I_{-\varphi k}$ ($1 \le k \le K$) and the viewpoint image I in the sequence of phase differences from $I_{\varphi K}$, $I_{\varphi(K-1)}$, $\ldots$, $I_{\varphi 1}$, $I$, $I_{-\varphi 1}$, $\ldots$, $I_{-\varphi K}$, that is, in the sequence of the viewpoint positions, and projects the arranged images onto a screen.

Further, for $k=-K, -(K-1), \ldots, -1, 0, 1, \ldots, K-1$, the pseudo viewpoint image $I_{\varphi k}$ and the pseudo viewpoint image $I_{\varphi(k+1)}$ are viewpoint images at viewpoint positions adjacent to each other, and the synthesized luminance of at least two images of the pseudo viewpoint image $I_{\varphi k}$ and the pseudo viewpoint image $I_{\varphi(k+1)}$ may be used to present the images at viewpoints located at an intermediate position between the viewpoint positions adjacent to each other.

Hereinafter, the configuration and operation of the image generation unit 10 will be described in detail with reference to FIG. 4. Here, a case in which the phase difference is $\pi/2$ will be described. In addition, in the description, a viewpoint image is referred to as an original image, a disparity inducing edge is referred to as a phase modulated image, and a pseudo viewpoint image is referred to as an added image.

Image Generation Unit 10

Figure 4:
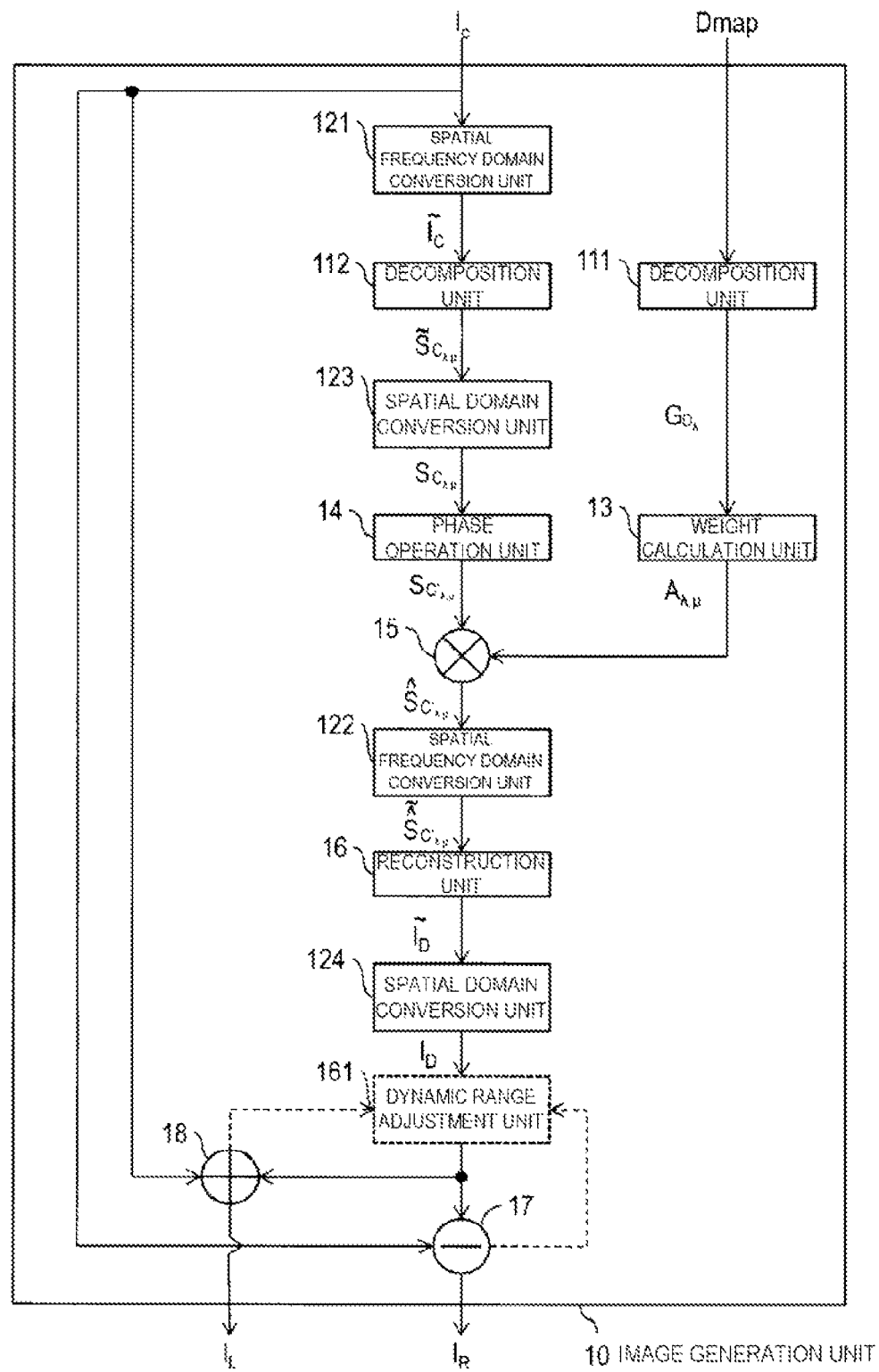
FIG. 4 is a block diagram illustrating a configuration of an image generation unit 10.

As illustrated in FIG. 4, the image generation unit 10 includes decomposition units 111, 112, spatial frequency domain conversion units 121, 122, spatial domain conversion units 123, 124, a weight calculation unit 13, a phase operation unit 14, a weighting unit 15, a reconstruction unit 16, and superposition units 17, 18.

The processing by the image generation unit 10 will be described.

The original image $I_C$ and the disparity map Dmap are input to the image generation unit 10. The original image $I_C$ is a two-dimensional array having $I_C(x, y)$ as elements (pixels). The original image $I_C$ may be a still image, an image of individual frame of a moving image, an image read from an external recording device, or an image read from the recording unit 90. The disparity map Dmap is a two-dimensional array (two-dimensional grayscale image) having $d(x, y)$ as elements (pixels). Here, the size of Dmap is the same as the size of the original image $I_C$, x represents the horizontal coordinate of the spatial domain, y represents the vertical coordinate of the spatial domain, and it is satisfied that $x_{min} \le x \le x_{max}$, $y_{min} \le y \le y_{max}$, $x_{min} < x_{max}$, $y_{min} < y_{max}$. $d(x, y)$ is one of a positive value, a negative value, and zero. In Dmap, in a region where $d(x, y) > 0$, a disparity (crossed disparity) causes the region to be seen nearer than the display surface or the screen surface, and in a region where $d(x, y) < 0$, a disparity (uncrossed disparity) causes the region to be seen farther than the display surface or the screen surface. The larger the absolute value $|d(x, y)|$, the greater the disparity. Such a Dmap can provide a desired disparity to each image region.

The original image $I_C$ is input to the spatial frequency domain conversion unit 121. The spatial frequency domain conversion unit 121 converts the original image $I_C$ into the original image $\tilde{I}_C$ in the spatial frequency domain, and outputs original image $\tilde{I}_C$. Here, the original image $\tilde{I}_C$ in the spatial frequency domain is a two-dimensional array having $\tilde{I}_C(\omega_x, \omega_y)$ as elements. $\omega_x$ represents the spatial frequency in the horizontal direction, and $\omega_y$ represents the spatial frequency in the vertical direction. For conversion from the original image $I_C$ to the original image $\tilde{I}_C$, for example, discrete Fourier transform can be used. It should be noted that the superscript "~" of "$\tilde{I}_C$" should be given directly above "I". However, "~" may be given at the upper right of "$I_C$" due to restrictions on the description in the specification (step S121).

The original image $\tilde{I}_C$ in the spatial frequency domain is input to the decomposition unit 112. The decomposition unit 112 applies a complex steerable filter sequence $\Psi$ to the original image $\tilde{I}_C$ and obtains and outputs a complex steerable pyramid. Here, the steerable filter sequence $\Psi$ includes a steerable filter $\Psi_{\lambda, \mu}$, corresponding to the spatial frequency band $\lambda$ and the orientation band $\mu$. Here, $\lambda$ is an integer index corresponding to a spatial frequency band having a predetermined width, and $\mu$ is an integer index corresponding to an orientation band having a predetermined width. The conditions, $\lambda_{min} \le \lambda \le \lambda_{max}$, $\mu_{min} \le \mu \le \mu_{max}$, $\lambda_{min} < \lambda_{max}$, $\mu_{min} < \mu_{max}$, are satisfied. A smaller $\lambda$ corresponds to a lower frequency band. As described below, for all combinations of $\lambda$ and $\mu$, the decomposition unit 112 multiplies the steerable filter $\Psi_{\lambda, \mu}$ to the original image $\tilde{I}_C$ and obtains and outputs a complex steerable pyramid $\tilde{S}_{C\lambda,\mu}$ corresponding to each spatial frequency band $\lambda$ and each orientation band $\mu$.

[Equation 1]

$$\tilde{S}_{C_{\lambda,\mu}} = I_C \Psi_{\lambda,\mu} \quad (1)$$

It should be noted that the superscript "~" of "$S_{C\lambda,\mu}$~" should be given directly above "S" (see Equation (1)). However, "~" may be given at the upper right of "$S_{C\lambda,\mu}$" due to restrictions on the description in the specification. Further, the subscript "$C\lambda, \mu$" of "$S_{C\lambda,\mu}$~" should be given as in "$C_{\lambda,\mu}$~" (see Equation (1)). However, it may be given as "$C\lambda, \mu$" due to restrictions on the description in the specification (step S112).

The complex steerable pyramid $S_{C\lambda,\mu}$~ is input to the spatial domain conversion unit 123. The spatial domain conversion unit 123 converts the complex steerable pyramid $S_{C\lambda,\mu}$~ into the complex steerable pyramid $S_{C\lambda,\mu}$ in the spatial domain, and outputs a complex steerable pyramid $S_{C\lambda,\mu}$. For example, discrete inverse Fourier transform can be used for the conversion from the complex steerable pyramid $S_{C\lambda,\mu}$~ to the complex steerable pyramid S Each complex steerable pyramid $S_{C\lambda,\mu}$ is a two-dimensional array having $S_{C\lambda,\mu}(x, y)$ as elements (pixels) (step S123).

The complex steerable pyramid $S_{C\lambda,\mu}$ in the spatial domain is input to the phase operation unit 14. The phase operation unit 14 extracts an imaginary part $\text{Im}[S_{C\lambda,\mu}(x, y)]$ of each complex steerable pyramid $S_{C\lambda,\mu}$, and obtains and outputs each phase shift image $S_{C'\lambda,\mu}$ corresponding to each spatial frequency band $\lambda$ and each orientation band $\mu$ as follows.

[Equation 2]

$$S_{C'_{\lambda,\mu}}(x,y) = \begin{cases} \text{Im}[S_{C_{\lambda,\mu}}(x,y)] & \text{if } \theta_\mu \leq \pi/2 \\ -\text{Im}[S_{C_{\lambda,\mu}}(x,y)] & \text{if } \theta_\mu > \pi/2 \end{cases} \quad (2)$$

Here, each phase shift image $S_{C\lambda,\mu}$ is a two-dimensional array having $S_{C\lambda,\mu}(x, y)$ as elements (pixels). The subscript "$C'\lambda, \mu$" of "$S_{C'\lambda,\mu}$" should be given as "$C'_{\lambda,\mu}$" (see Equation (2)). However, it may be given as "$C'\lambda, \mu$" due to restrictions on the description in the specification. $\theta_\mu$ refers to the orientation (peak orientation) corresponding to the component having the strongest power among the orientations included in the orientation band $\mu$. An example of $\theta_\mu$ is the orientation of the center of the orientation band $\mu$. $\theta_\mu$ is the angle formed by the lattice in the spatial domain consisting of certain spatial frequency components with respect to the vertical orientation, and satisfies $0 \leq \theta_\mu \leq \pi$. The phase of the phase shift image $S_{C\lambda,\mu}$ is obtained by shifting the phase of the sine wave component corresponding to the spatial frequency band $\lambda$ and the orientation band $\mu$ of the original image $I_C$ by $0.5\pi$ [rad] in the positive direction. In Equation (2), the reason why the polarity is inversed when $\theta_\mu > \pi/2$ is because the phase is shifted by $0.5\pi$ [rad] in the same direction (in the positive direction) for both the range of $0 \leq \theta_\mu \leq \pi/2$ and the range of $\pi \geq \theta_\mu > \pi/2$ (step S14).

The disparity map Dmap which has been input to the image generation unit 10 is input to the decomposition unit 111. The decomposition unit 111 applies a Gaussian filter sequence to the disparity map Dmap to obtain and output a Gaussian pyramid $G_{D\lambda}(x, y)$ of the disparity map Dmap. The Gaussian pyramid $G_{D\lambda}$ includes spatial frequencies corresponding to spatial frequency band $\lambda$ and lower spatial frequency bands than the spatial frequency band $\lambda$. That is, $G_{D\lambda}(x, y)$ represents the value of each coordinate (x, y) of the Gaussian pyramid of the disparity map Dmap corresponding to the spatial frequency band $\lambda$ corresponding to $\omega\lambda$ and the spatial frequency band lower than the spatial frequency band $\lambda$. The subscript "$D\lambda$," of "$G_{D\lambda}$" should be given as "$D_\lambda$". However, it may be given as "$D\lambda$" due to restrictions on the description in the specification (step S111).

The Gaussian pyramid $G_{D\lambda}(x, y)$ input to the weight calculation unit 13. The weight calculation unit 13 obtains and outputs a weight image $A_{\lambda,\mu}$ which is a two-dimensional array having each weight $A_{\lambda,\mu}(x, y)$ as an element as follows.

[Equation 3]

$$A_{\lambda,\mu}(x,y) = \tan\frac{G_{D_\lambda}(x,y)\omega_\lambda|\cos\theta_\mu|}{2} \quad (3)$$

Here, $\omega\lambda$ means a spatial frequency (peak spatial frequency) corresponding to a component having the strongest power among the spatial frequencies included in the spatial frequency band $\lambda$. An example of $\omega\lambda$ is the spatial frequency at the center of the spatial frequency band $\lambda$ (step S13).

The phase shift image $S_{C\lambda,\mu}$ and weight image $A_{\lambda,\mu}$ are input to the weighting unit 15. As follows, the weighting unit 15 multiplies each $A_{\lambda,\mu}(x, y)$ of the weight image $A_{\lambda,\mu}$ to each element $S_{C\lambda,\mu}(x, y)$ of the phase shift image $S_{C\lambda,\mu}$ and obtains and outputs a weighted image $\hat{S}_{C\lambda,\mu}$ which is a two-dimensional array having each $\hat{S}_{C\lambda,\mu}(x, y)$ as an element.

[Equation 4]

$$\hat{S}_{C'_{\lambda,\mu}}(x,y) = A_{\lambda,\mu}(x,y) S_{C'_{\lambda,\mu}}(x,y) \quad (4)$$

It should be noted that the superscript "^" of "S^" should be given directly above "S" (see Equation (4)). However, "^" may be given at the upper right of "S" due to the restrictions on the description in the specification (step S15).

The weighted image $\hat{S}_{C\lambda,\mu}$ is input to the spatial frequency domain conversion unit 122. The spatial frequency domain conversion unit 122 converts the weighted image $\hat{S}_{C\lambda,\mu}$ into the weighted image $\tilde{S}_{C\lambda,\mu}$ in the spatial frequency domain, and outputs the weighted image $\tilde{S}_{C\lambda,\mu}$. Note that, it may be described as "$\tilde{S}_{C\lambda,\mu}$" due to restrictions on the description in the specification, but "$\tilde{S}_{C\lambda,\mu}$" is synonymous with [Equation 5].

[Equation 5]

$$\tilde{\hat{S}}_{C'_{\lambda,\mu}}$$

Note that, for example, a discrete Fourier transform can be used for the conversion from the weighted image $\hat{S}_{C\lambda,\mu}$ to the weighted image $\tilde{S}_{C\lambda,\mu}$ (step S122).

The weighted image $\tilde{S}_{C\lambda,\mu}$ is input to the reconstruction unit 16. The reconstruction unit 16 applies the above-described steerable filter sequence $\Psi$ to the weighted image $\tilde{S}_{C\lambda,\mu}$ and obtains and outputs the phase modulated image $\tilde{I}_D$ in the spatial frequency domain as follows (step S16).

[Equation 6]

$$\tilde{I}_D = \sum_{\lambda,\mu} \Psi_{\lambda,\mu} \tilde{S}_{C'_{\lambda,\mu}} \qquad (5)$$

The phase modulated image $\tilde{I}_D$ in the spatial frequency domain is input to the spatial domain conversion unit 124. The spatial domain conversion unit 124 converts the phase modulated image $\tilde{I}_D$ in the spatial frequency domain into the phase modulated image $I_D$ in the spatial domain, and outputs the phase modulated image $I_D$. Here, the phase modulated image $I_D$ is a two-dimensional array having $I_D$ (x, y) as elements (pixels). For conversion from the phase modulated image $\tilde{I}_D$ to the phase modulated image $I_D$, for example, a discrete inverse Fourier transform can be used (step S124).

The superposition unit 17 receives the original image $I_C$ and the phase modulated image $I_D$ as inputs, and obtains and outputs the added image $I_R$ (image A), by superimposing a polarity-inversed image (phase modulation component a) of the phase modulated image $I_D$ on the original image $I_C$. When the value of the disparity map Dmap is positive (crossed disparity) in a certain region, the phase of the phase modulated image $I_D$ in the corresponding region is shifted from the phase of the original image $I_C$ by $0.5\pi$ [rad] in the positive direction. Thus, the phase of the polarity-inversed image (phase modulation component a) of the phase modulated image $I_D$ is obtained by shifting the phase of the original image $I_C$ by $0.5\pi$ [rad] in the negative direction. On the other hand, when the value of the disparity map Dmap is negative in a certain region, the phase of the phase modulated image $I_D$ is obtained by shifting the phase of the original image $I_C$ by $0.5\pi$ [rad] in the negative direction. Thus, the phase of the polarity-inversed image (phase modulation component a) of the phase modulated image $I_D$ in this region is obtained by shifting the phase of the original image $I_C$ by $0.5\pi$ [rad] in the negative direction. The pixel value $I_R$ (x, y) of each coordinate (x, y) of the added image $I_R$ is obtained by adding the pixel value $I_D$ (x, y) of each coordinate (x, y) of the polarity-inversed image of the phase modulated image $I_D$ to the pixel value $I_C$ (x, y) of each coordinate (x, y) of the original image $I_C$ ($I_R$ (x, y)=$I_C$ (x, y)−$I_D$ (x, y)). Note that the polarity-inversed image of the phase modulated image $I_D$ and the added image $I_R$ correspond to "image containing phase modulation component a" obtained by giving the weight corresponding at least each "first region" to each "first region" of the image obtained by changing the phase of the original image $I_C$ (step S17).

The superposition unit 18 receives the original image $I_C$ and the phase modulated image $I_D$ as input, and superimposes the original image $I_C$ and the phase modulated image $I_D$ (phase modulation component b) and obtains and outputs an added image $I_L$ (image B). The phase modulation component b is an inverse phase image of the phase modulation component a. When the value of the disparity map Dmap is positive (crossed disparity) in a certain region, the phase of the phase modulated image $I_D$ in the corresponding region is shifted from the phase of the original image $I_C$ by $0.5\pi$ [rad] in the positive direction. Thus, the phase of the phase modulation component b in this region is obtained by shifting the phase of the original image $I_C$ by $0.5\pi$ [rad] in the positive direction. On the other hand, when the value of the disparity map Dmap is negative in a certain region, the phase of the phase modulated image $I_D$ in the corresponding region is shifted from the phase of the original image $I_C$ by $0.5\pi$ [rad] in the negative direction. Thus, the phase of the phase modulation component b in this region is obtained by shifting the phase of the original image $I_C$ by $0.5\pi$ [rad] in the negative direction. The pixel value $I_L$ (x, y) of each coordinate (x, y) of the added image $I_L$ is obtained by adding the pixel value $I_C$ (x, y) of each coordinate (x, y) of the original image $I_C$ and the pixel value $I_D$ (x, y) of each coordinate (x, y) of the phase modulated image $I_D$ ($I_L$ (x, y)=$I_C$ (x, y)+$I_D$ (x, y)). Note that the phase modulated image $I_D$ and the added image $I_L$ correspond to "image containing phase modulation component b" obtained by giving the weight corresponding at least each "second region" to each "second region" of the image obtained by changing the phase of the original image $I_C$ (step S18).

Hereinafter, modification examples of the image generation unit 10 will be described.

Modification Example 1

Theoretically, the maximum value of the disparity between the added images $I_R$ and $I_L$ is a half wavelength of each wavelength. However, in order to obtain a shift of a half wavelength, the above-described weight $A_{\lambda,\mu}$ (x, y) needs to be infinite, which is not practical. Thus, the absolute values of the phase shift amounts of the added images $I_R$, $I_L$ with respect to the original image $I_C$ may be limited to $\pi/4$ [rad] or less. Under such restrictions, the absolute value of the weight $A_{\lambda,\mu}$ (x, y) becomes 1 or less, and the absolute value of the disparity between the added images $I_R$, $I_L$ is less than $\pi/(2\omega_\lambda |\cos\theta_\mu|)$. In this case, the weight calculation unit 13 obtains and outputs a weight image $A_{\lambda,\mu}$ which is a two-dimensional array having each weight $A_{\lambda,\mu}$ (x, y) as an element, according to the following Equation (6) instead of Equation (3).

[Equation 7]

$$A_{\lambda,\mu}(x, y) = \tan\frac{\hat{G}_{D_\lambda}(x, y)\omega_\lambda|\cos\theta_\mu|}{2} \qquad (6)$$

where

[Equation 8]

$$\hat{G}_{D_\lambda}(x, y) = \begin{cases} \dfrac{\pi}{2\omega_\lambda|\cos\theta_\mu|} & \text{if } G_{D_\lambda}(x, y) > \dfrac{\pi}{2\omega_\lambda|\cos\theta_\mu|} \\ -\dfrac{\pi}{2\omega_\lambda|\cos\theta_\mu|} & \text{if } G_{D_\lambda}(x, y) < -\dfrac{\pi}{2\omega_\lambda|\cos\theta_\mu|} \\ G_{D_\lambda}(x, y) & \text{otherwise} \end{cases}$$

When this modification example is applied, comparing the weights of the spatial frequency bands included in the same orientation band, the weight corresponding to the spatial frequency band $\lambda_1$ (first spatial frequency band) having a certain spatial frequency $\omega\lambda 1$ as a peak is less than or equal to the weight corresponding to the spatial frequency band $\lambda_2$ (second spatial frequency band) having the peak at the spatial frequency $\omega\lambda 2$ higher than the spatial frequency band $\lambda_1$ (that is, $\omega\lambda 2 > \omega\lambda 1$). Further, when the weights of the orientation bands included in the same spatial frequency band are compared, the weight corresponding to the orientation band $\mu_1$ (first orientation band) having a certain orientation $\theta_\mu 1$ as the peak is less than or equal to the weight corresponding to the orientation band $\mu_2$ (second orientation band) having as the peak, orientation $\theta_\mu 2$ which is closer to the vertical orientation than the orientation band $\mu_1$ (0 or $\pi$) (that is, $|\theta_{\mu 2}-\pi/2|>|\theta_{\mu 1}-\pi/2|$). The rest is as described for the image generation unit 10.

Modification Example 2

The image generation unit 10 superimposes the polarity-inversed image of the phase modulated image $I_D$ and the phase modulated image $I_D$ on the original image $I_C$ to obtain added images $I_R$ and $I_L$ having disparity. The amplitudes of the added images $I_R$ and $I_L$ obtained in this manner are larger than the amplitude of the original image $I_C$, and the added images $I_R$ and $I_L$ may exceed the predetermined lower limit $b_L$ and/or upper limit $b_U$ ($b_L<b_U$), that is, a predetermined dynamic range. As a simple countermeasure against this, a method of linearly compressing the total intensity of the added images $I_R$ and $I_L$ such that the added images $I_R$ and $I_L$ fall within the range between the lower limit $b_L$ and the upper limit $b_U$ is conceivable. However, with this simple measure, the contrast of the added images $I_R$ and $I_L$ is smaller than that of the original image $I_C$, and the impression of the image changes. In addition, a countermeasure for deleting a portion exceeding the lower limit value $b_L$ and/or the upper limit value $b_U$ of the added images $I_R$ and $I_L$ may be considered. In this case, there is a possibility that a doubly blurred image may be perceived when the added images $I_R$ and $I_L$ are not canceled out and the added images $I_R$ and $I_L$ are viewed at once by both eyes. Thus, in Modification Example 2, the phase modulated image $I_D$ corresponding to a portion exceeding the lower limit $b_L$ or the upper limit $b_U$ of the added images $I_R$ and $I_L$ is clipped.

More specific description will be made. In Modification Example 2, the image generation unit 10 further includes a dynamic range adjustment unit 161 (see FIG. 4). The dynamic range adjustment unit 161 receives the phase modulated image $I_D$ and the added images $I_R$ and $I_L$ obtained by the superposition units 17, 18 as inputs, updates the phase modulated image $I_D$ into a phase modulated image $I_D^\wedge$ as follows, and outputs the image.

[Equation 9]

$$\hat{I}_D(x,y)=I_D(x,y)-M_U(x,y)-M_L(x,y) \quad (7)$$

Here, the phase modulated image $I_D^\wedge$ is a two-dimensional array including elements $I_D^\wedge(x, y)$, and $M_U$ (x, y)=max (max ($I_R$ (x, y)–$b_U$, 0), max ($I_L$ (x, y)–$b_U$, 0)), $M_L$ (x, y)=min (min ($I_R$ (x, y)–$b_L$, 0), min ($I_L$ (x, y)–$b_L$, 0)). max ($\alpha 1$, $\alpha 2$) represents the larger value of $\alpha 1$ and $\alpha 2$, and min ($\alpha 1$, $\alpha 2$) represents the smaller value of $\alpha 1$ and $\alpha 2$. Note that, "^" in "$I_D^\wedge$" should be given directly above "I" (see Equation (7)). However, "^" may be given at the upper right of "$I_D$" due to restrictions on the description in the specification.

In this case, the superposition unit 17 further receives the original image $I_C$ and the phase modulated image $I_D^\wedge$, and obtains and outputs the added image $I_R$ (image A) by superimposing a polarity-inversed image (phase modulation component a) of the phase modulated image $I_D^\wedge$ on the original image $I_C$. The pixel value $I_R$ (x, y) of each coordinate (x, y) of the added image $I_R$ is obtained by subtracting the pixel value $I_D^\wedge(x, y)$ of each coordinate (x, y) of the phase modulated image $I_D^\wedge$ from the pixel value $I_C$ (x, y) of each coordinate (x, y) of the original image $I_C$ ($I_R$ (x, y)=$I_C$ (x, y)–$I_D^\wedge(x, y)$). In this case, the added image $I_R$ obtained in step S17 described above is not output as the image A.

The superposition unit 18 further receives the original image $I_C$ and the phase modulated image $I_D^\wedge$ as inputs, and obtains and outputs an added image $I_L$ (image B) by superimposing the original image $I_C$ and the phase modulated image $I_D^\wedge$ (phase modulation component b). The pixel value $I_L$ (x, y) of each coordinate (x, y) of the added image $I_L$ is obtained by adding the pixel value $I_C$ (x, y) of each coordinate (x, y) of the original image $I_C$ and the pixel value $I_D$ (x, y) of each coordinate (x, y) of the phase modulated image $I_D^\wedge(I_L$ (x, y)=$I_C$ (x, y)+$I_D^\wedge(x, y)$). In this case, the added image $I_L$ obtained in step S18 described above is not output as the image B.

Modification Example 3

When the original image $I_C$ is a color image, the processes of steps S121, S112, S123, S14, S15, S122, S16, S124, S17, and S18 are executed on each color channel (R, G, and B channels), and the added image $I_R$ (image A) and the added image $I_L$ (image B) of all color channels may be output. Modification Examples 1 and 2 may be performed even when the original image $I_C$ is a color image, and the process of Modification Example 2 in this case is performed for each color channel.

Modification Example 4

The image generation unit 10 sets an image obtained by shifting the phase of the original image $I_C$ in the positive direction by 0.5$\pi$ [rad] as a phase-shifted image $S_{C\lambda, \mu}$ (Equation (2)). However, an image obtained by shifting the phase of the original image $I_C$ in the positive direction by an amount close to 0.5$\pi$ may be used as the phase shift image $S_{C\lambda, \mu}$. In this case, the phase of the region of the polarity-inversed image (phase modulation component a) of the phase modulated image $I_D$ corresponding to the region where the value of the disparity map Dmap is positive (crossed disparity) is obtained by shifting the phase of the original image $I_C$ by an amount close to 0.5$\pi$ [rad] in the negative direction. On the other hand, the phase of the region of the polarity-inversed image (phase modulation component a) of the phase modulated image $I_D$ corresponding to the region where the value of the disparity map Dmap is negative is obtained by shifting the phase of the original image $I_C$ by an amount close to 0.5$\pi$ [rad] in the positive direction. The phase of the region of the phase modulated image $I_D$ (phase modulation component b) corresponding to the region where the value of the disparity map Dmap is positive (crossed disparity) is obtained by shifting the phase of the original image $I_C$ by an amount close to 0.5$\pi$ [rad] in the positive direction. On the other hand, the phase of the region of the phase modulated image $I_D$ (phase modulation component b) corresponding to the region where the value of the disparity map Dmap is negative is obtained by shifting the phase of the original image $I_C$ by an amount close to 0.5$\pi$ [rad] in the negative direction. Further, instead of using the polarity-inversed image of the phase modulated image $I_D$ as the phase modulation component a and the phase modulated image $I_D$ as the phase modulation component b, the polarity-inversed image of the phase modulated image $I_D$ may be the phase modulation component a, and an image near the opposite phase of the phase modulation component a may be the phase modulation component b.

Others

As described in (image generation unit 10), a phase modulated image having a phase difference of $\pi/2$ is generated by using Equation (2). By using a predetermined equation instead of Equation (2), a phase modulated image having any phase difference can be generated.

The image generation unit 10 has been described in detail including modification examples in the above. Hereinafter, a case where K=2, $\varphi 1=\pi/4$, $\varphi 2=\pi/2$ will be described as an example (see FIG. 5). The image generation unit 10 generates the pseudo viewpoint images $I_{\pi/4}$, $I_{-\pi/4}$ and the pseudo viewpoint images $I_{\pi/2}$, $I_{-\pi/2}$, and outputs the pseudo viewpoint images $I_{\pi/2}$, $I_{-\pi/2}$, $I_{\pi/4}$, and $I_{-\pi/4}$ and the viewpoint image I. When these images are projected onto a screen using five projectors (projection apparatuses) in the sequence of $I_{\pi/2}$, $I_{\pi/4}$, I, $I_{-\pi/4}$, $I_{-\pi/2}$, and presented to an viewer, as the viewer moves, the viewer observes, for example, in the sequence of $I_{\pi/2}$, $I_{\pi/4}$, I, $I_{-\pi/4}$, $I_{-\pi/2}$. At this time, the image quality increases substantially linearly up to the images $I_{\pi/2}$, $I_{\pi/4}$, and I. Then, with the image quality of the image I as a peak, the image quality decreases substantially linearly up to I, $I_{-\pi/4}$, $I_{-\pi/2}$. For example, at the viewpoint position 1, the intermediate viewpoint position between the viewpoint position 1 and the viewpoint position 2, and the viewpoint position 2, the image quality gradually increases, so that the image quality does not fluctuate from good→poor→good as in the linear blending in the art. This enables to suppress unpleasant feelings that a viewer experiences due to fluctuation in image quality.

According to the disclosure of the present embodiment, it is possible to generate any number of pseudo viewpoint images at a viewpoint position different from the viewpoint position of the viewpoint image I, from one viewpoint image I and the disparity map Dmap. Further, by arranging the pseudo viewpoint image and the viewpoint image I in a sequence of the phase difference and projecting with the projector, it is possible to suppress unpleasant feelings associated with fluctuation in image quality caused by the viewer's viewpoint movement.

Second Embodiment

Figure 6:
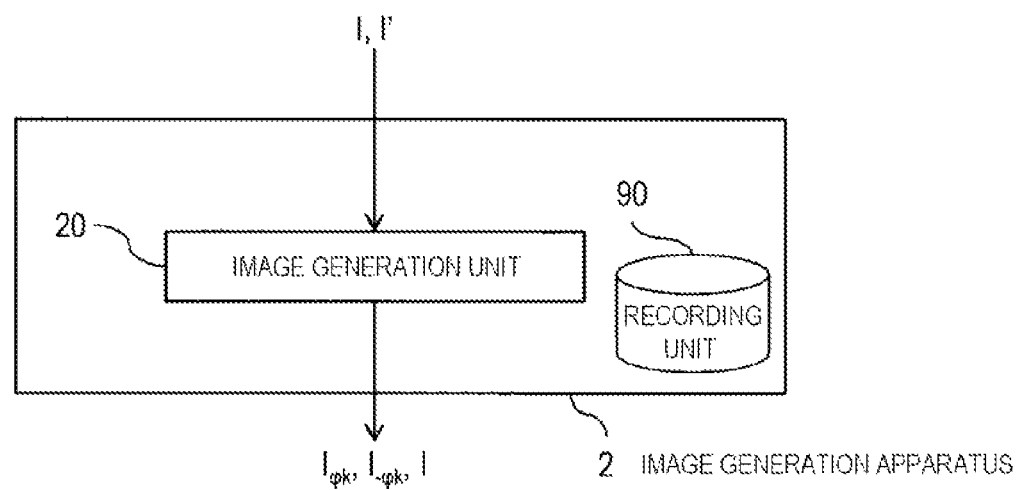
FIG. 6 is a block diagram illustrating a configuration of an image generation apparatus 2.
Figure 7:
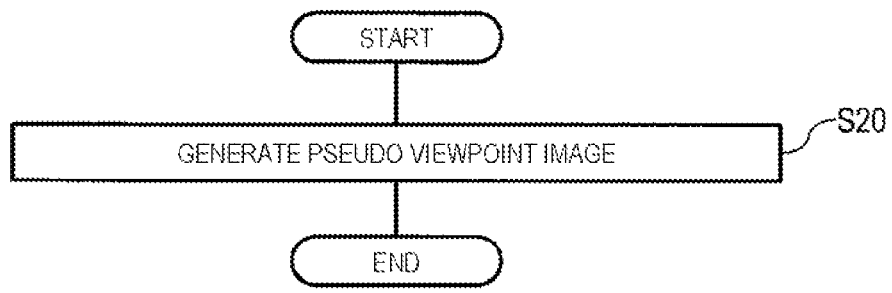
FIG. 7 is a flowchart illustrating an operation of the image generation apparatus 2.

Hereinafter, an image generation apparatus 2 will be described with reference to FIG. 6 and FIG. 7. FIG. 6 is a block diagram illustrating a configuration of the image generation apparatus 2. FIG. 7 is a flowchart illustrating the operation of the image generation apparatus 2. As illustrated in FIG. 6, the image generation apparatus 2 includes an image generation unit 20 and a recording unit 90. The recording unit 90 is a component configured to appropriately record information required for processing of the image generation apparatus 2.

The image generation apparatus 2 receives, as inputs, the viewpoint image I and an adjacent viewpoint image I', generates 2K (K is an integer of 1 or more) pseudo viewpoint images $I_{\varphi k}$, $I_{-\varphi k}$ from the viewpoint image I and an adjacent viewpoint image I' (1≤k≤K), and outputs pseudo viewpoint images $I_{\varphi k}$, $I_{-\varphi k}$ (1≤k≤K) and the viewpoint image I. Here, $\varphi k(1\leq k\leq K)$ represents the phase difference between the viewpoint image I and the disparity inducing edge $D_{\varphi k}$, and is a real number satisfying $0<\varphi 1<\ldots<\varphi K\leq\pi/2$. The disparity inducing edge $D_{\varphi k}$ is an image obtained by modulating a phase such that a phase difference from the viewpoint image I becomes $\varphi k$. Further, the pseudo viewpoint image $I_{\varphi k}$, $I_{-\varphi k}$ are images both at the viewpoint position different from the viewpoint position of the viewpoint image I (see FIG. 5). In the following, it is presented that $\varphi 0=0$, $I_{\varphi 0}=I$, and the viewpoint image I may be referred to as a pseudo viewpoint image $I_{\varphi 0}$.

Note that, assuming a plurality of viewpoint positions horizontally arranged at equal intervals toward an object to be captured, an image captured by the camera from each viewpoint position is a viewpoint image, and an image captured from an adjacent viewpoint position is referred to as "the adjacent viewpoint image". That is, the image generation apparatus 2 receives the viewpoint image I and the viewpoint image I' captured from the viewpoint position adjacent to the viewpoint position where the viewpoint image I is captured.

The operation of the image generation apparatus 2 will be described in accordance with FIG. 7.

In step S20, the image generation unit 20 receives, as an input, the viewpoint image I and the adjacent viewpoint image I', generates a pseudo viewpoint image $I_{\varphi k}$, $I_{-\varphi k}$ from the viewpoint image I and the viewpoint image I', for k=1, . . . , K, and outputs the pseudo viewpoint image $I_{\varphi k}$, $I_{-\varphi k}$ (1≤k≤K) and the viewpoint image I. A procedure for generating the pseudo viewpoint images $I_{\varphi k}$, $I_{-\varphi k}$ will be described. First, the image generation unit 20 generates a disparity inducing edge $D_{\varphi k}$, which is a phase modulated image having a phase difference $\varphi k$ from the viewpoint image I, from the viewpoint image I and the viewpoint image I'. Next, the image generation unit 20 generates the pseudo viewpoint image $I_{\varphi k}$ ($I_{\varphi k}=I+D_{\varphi k}$) by adding the disparity inducing edge $D_{\varphi k}$ to the viewpoint image I, and generates the pseudo viewpoint image $I_{-\varphi k}$ ($I_{-\varphi k}=I-D_{\varphi k}$) by adding the polarity-inversed image of the disparity inducing edge $D_{\varphi k}$ to the viewpoint image I. The image generation unit 20 sequentially generates the pseudo viewpoint images $I_{\varphi k}$, $I_{-\varphi k}$ (1≤k≤K).

Note that the image generation apparatus 2 may further include a projection unit (not illustrated) that projects the pseudo viewpoint images $I_{\varphi k}$, $I_{-\varphi k}$ (1≤k≤K) and the viewpoint image I output at S20. The projection unit arranges the pseudo viewpoint images $I_{\varphi k}$, $I_{-\varphi k}$ (1≤k≤K) and the viewpoint image I in an sequence of phase differences from $I_{\varphi K}$, $I_{\varphi(K-1)}$, . . . , $I_{\varphi 1}$, I, $I_{-\varphi 1}$, . . . , $I_{-\varphi K}$, that is, in a sequence of the viewpoint position, and projects the arranged images onto the screen.

Further, for k=-K, -(K-1), . . . , -1, 0, 1, . . . , K-1, the pseudo viewpoint image $I_{\varphi k}$ and the pseudo viewpoint image $I_{\varphi(k+1)}$ are viewpoint images at viewpoint positions adjacent to each other, and the synthesized luminance of at least two images of the pseudo viewpoint image $I_{\varphi k}$ and the pseudo viewpoint image $I_{\varphi(k+1)}$ may be used to present the images at viewpoints located in an intermediate position between the viewpoint positions adjacent to each other.

Hereinafter, the configuration and operation of the image generation unit 20 will be described in detail with reference to FIG. 8. Here, a case in which the phase difference is $\pi/2$ will be described. In addition, in the description, a viewpoint image is referred to as an original image, a disparity inducing edge is referred to as a phase modulated image, and a pseudo viewpoint image is referred to as an added image.

Image Generation Unit 20

Figure 8:
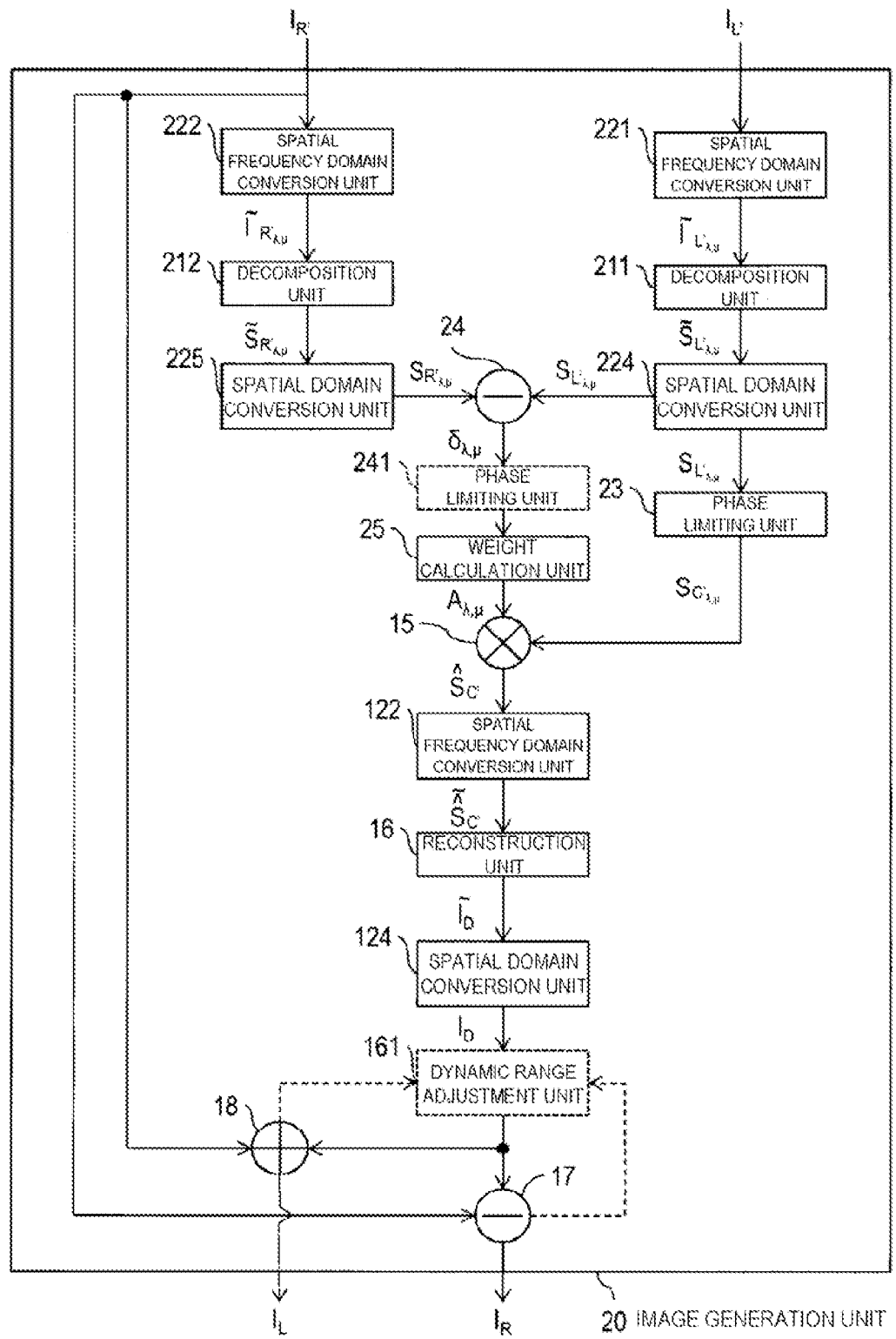
FIG. 8 is a block diagram illustrating a configuration of an image generation unit 20.

As illustrated in FIG. 8, the image generation unit 20 includes spatial frequency domain conversion units 122, 221, 222, spatial domain conversion units 124, 224, 225, decomposition units 211, 212, a phase operation unit 23, and a phase difference calculation unit 24, a weight calculation unit 25, a weighting unit 15, a reconstruction unit 16, and superposition units 17, 18.

The processing by the image generation unit 20 will be described.

An original image $I_L=I_C$ (first original image) and an original image $I_{R'}$ (second original image) are input to the image generation unit 20. The original image $I_{L'}$ and the original image $I_{R'}$ are, for example, three-dimensional image contents for giving images an apparent depth by a binocular image presentation technology. There is a phase difference recognized as binocular disparity between the original image $I_{L'}$ and the original image $I_{R'}$. In other words, there is a phase difference recognized as binocular disparity between the original image $I_{L'}$ and the original image $I_{R'}$. When the original image $I_{R'}$ is viewed by one eye (for example, the right eye) and the original image $I_{L'}$ is viewed by the other eye (for example, the left eye), a "stereoscopic image" is perceived. On the other hand, when both the original image $I_{R'}$ and the original image $I_{L'}$ are viewed with both eyes, a doubly blurred image is perceived. The original image $I_R$, is a two-dimensional array having $I_{R'}(x, y)$ as an element, and the original image ILS is a two-dimensional array having $I_{L'}(x, y)$ as elements (pixels). The original image $I_{R'}$ and the original image $I_{L'}$ may be a still image, an image of individual frame of a moving image, an image read from an external recording device, or an image read from the recording unit 90.

The original image $I_{L'}$ is input to the spatial frequency domain conversion unit 221, and the original image $I_{R'}$ is input to the spatial frequency domain conversion unit 222. The spatial frequency domain conversion unit 221 converts the original image $I_{L'}$ into the original image $\tilde{I}_{L'}$ in the spatial frequency domain, and outputs the original image $\tilde{I}_{L'}$. The spatial frequency domain conversion unit 222 converts the original image $I_{R'}$ into the original image $\tilde{I}_{R'}$ in the spatial frequency domain, and outputs the original image $\tilde{I}_{R'}$. For the conversion in the spatial frequency domain conversion units 221 and 222, for example, a discrete Fourier transform can be used. It should be noted that the superscript "~" of "$I_L$~" "$I_R$~" should be given directly above "I". However, "~" may be given at the upper right of "$I_L$" and "$I_R$" due to restrictions on the description in the specification (steps S221, S222).

The original image $\tilde{I}_{R'}$ in the spatial frequency domain is input to the decomposition unit 211, and the original image $\tilde{I}_{L'}$ in the spatial frequency domain is input to the decomposition unit 212. The decomposition units 211 and 212 apply the complex steerable filter sequence $\Psi$ to the original images $\tilde{I}_{R'}$ and $\tilde{I}_{L'}$ as described below, and obtain and output each complex steerable pyramid $\tilde{S}_{L\lambda, \mu}$ and $\tilde{S}_{R\lambda, \mu}$ corresponding to each spatial frequency band $\lambda$ and each orientation band $\mu$ (steps S211 and S212).

[Equation 10]

$$\tilde{S}_{L'_{\lambda,\mu}} = \tilde{I}_{L'} \Psi_{\lambda,\mu}$$

$$\tilde{S}_{R'_{\lambda,\mu}} = \tilde{I}_{R'} \Psi_{\lambda,\mu}$$

The complex steerable pyramids $\tilde{S}_{L\lambda, \mu}$ and $\tilde{S}_{R\lambda, \mu}$ are input to the spatial domain conversion units 224 and 225, respectively. The spatial domain conversion units 224 and 225 respectively convert the complex steerable pyramids $\tilde{S}_{L\lambda, \mu}$ and $\tilde{S}_{R\lambda, \mu}$ into the complex steerable pyramid $S_{L\lambda, \mu}$ and $S_{R\lambda, \mu}$ in the spatial domain, and output the complex steerable pyramids $S_{L\lambda, \mu}$ and $S_{R\lambda, \mu}$. For the conversion in the spatial domain conversion units 224 and 225, for example, a discrete inverse Fourier transform can be used. Each complex steerable pyramid $S_{L\lambda, \mu}$ is a two-dimensional array having $S_{L\lambda, \mu}(x, y)$ as elements (pixels), and each complex steerable pyramid $S_{R\lambda, \mu}$ is a two-dimensional array having $S_{R\lambda, \mu}(x, y)$ as elements (steps S224, S225).

The complex steerable pyramids $S_{L\lambda, \mu}$ and $S_{R\lambda, \mu}$ are input to the phase difference calculation unit 24. The phase difference calculation unit 24 obtains and outputs the phase difference $\delta_{\lambda, \mu}(x, y)$ between $S_{L\lambda, \mu}(x, y)$ and $S_{R\lambda, \mu}(x, y)$, by using the method described in Non-Patent Literature 1 (DIDYK, P., SITTHI-AMORN, P., FREEMAN, W., DURAND, F., AND MATUSIK, W. 2013, "Joint View Expansion and Filtering for Automultiscopic 3d Displays," ACM Trans. Graph. 32, 6737 (November), 221:1-221: 8). A set having the phase difference $\delta_{\lambda, \mu}(x, y)$ as an element is referred to as a phase difference $\delta_{\lambda, \mu}$. As described in reference Non-Patent Literature 1, for a spatial frequency band $\lambda$ having a phase difference exceeding $\pi/2$ [rad], a value twice the phase difference $\delta_{\lambda-1, \mu}(x, y)$ at the spatial frequency band $\lambda-1$ one lower than the spatial frequency band $\lambda$ is defined as a phase difference $\delta_{\lambda, \mu}(x, y)$.

$$\delta_{\lambda,\mu}(x,y) 2 \delta_{\lambda-1,\mu}(x,y) \qquad \text{[Equation 11]}$$

Here, the peak spatial frequency $\omega\lambda$ of the spatial frequency band $\lambda$ is twice or nearly twice the peak spatial frequency $\omega\lambda-1$ of the spatial frequency band $(\lambda-1)$ (step S24).

The phase difference $\delta_{\lambda, \mu}$ is input to the weight calculation unit 25. The weight calculation unit 25 obtains and outputs a weight $A_{\lambda, \mu}(x, y)$ as follows (step S25).

$$A_{\lambda,\mu}(x,y) = \tan\{\delta_{\lambda,\mu}(x,y)\} \qquad \text{[Equation 12]}$$

The complex steerable pyramid $S_{L\lambda, \mu}$ obtained by the spatial domain conversion unit 224 is input to the phase operation unit 23. The phase operation unit 23 extracts an imaginary part of the complex steerable pyramid $S_{L\lambda, \mu}$, sets $S_{C\lambda, \mu} = S_{L\lambda, \mu}$, and in accordance with Equation (2), obtains and outputs each phase shift image $S_{C\lambda, \mu}$ corresponding to each spatial frequency band $\lambda$ and each orientation band $\mu$ (step S224).

Thereafter, the processes of steps S15, S122, S16, and S124 described in (Image generation unit 10) are performed, and the spatial domain conversion unit 124 outputs the phase modulated image $I_D$. Further, the process of step S17 is performed, and the superposition unit 17 obtains and outputs the added image $I_R$ (image A). Further, the superposition unit 18 performs the process of step S18 to obtain and output the added image $I_L$ (image B).

Hereinafter, modification examples of the image generation unit 20 will be described.

Modification Example 1

As described in Modification Example 1 of the image generation unit 10, the absolute value of the phase shift amount of the added image $I_R$ with respect to the original image $I_L$, $= I_C$ may be limited to $\pi/4$ [rad] or less. In this case, the image generation unit 20 (see FIG. 8) further includes a phase difference limiting unit 241. The phase difference limiting unit 241 receives the phase difference $\delta_{\lambda, \mu}(x, y)$ obtained by the phase difference calculation unit 24 as an input, and updates the phase difference $\delta_{\lambda, \mu}(x, y)$ into $\hat{\delta}_{\lambda, \mu}(x, y)$ as follows.

[Equation 13]

$$\hat{\delta}_{\lambda,\mu}(x, y) = \begin{cases} \pi/4 & \text{if } \tau\delta_{\lambda,\mu}(x, y)/2 > \pi/4 \\ -\pi/4 & \text{if } \tau\delta_{\lambda,\mu}(x, y)/2 < -\pi/4 \\ \tau\delta_{\lambda,\mu}(x, y)/2 & \text{otherwise} \end{cases}$$

Here, $\tau$ is a positive constant for scaling. By reducing the value of $\tau$, the range where the phase difference is clipped to $\pi/4$ [rad] can be narrowed.

In this case, in step S25, $\hat{\delta}_{\lambda,\mu}(x, y)$ is input to the weight calculation unit 25 instead of the phase difference $\delta_{\lambda,\mu}(x, y)$. In this case, the weight calculation unit 25 obtains and outputs a weight $A_{\lambda,\mu}(x, y)$ as follows.

$$A_{\lambda,\mu}(x,y) = \tan\{\hat{\delta}_{\lambda,\mu}(x,y)\} \quad \text{[Equation 14]}$$

Subsequent processes are as described above.

Modification Example 2

As in Modification Example 2 of the image generation unit 10, the image generation unit 20 may further include the dynamic range adjustment unit 161 (see FIG. 8). In this case, as described in Modification Example 2 of the image generation unit 10, the dynamic range adjustment unit 161 updates the phase modulated image $I_D$ to the phase modulated image $\hat{I_D}$ and outputs the phase modulated image, the superposition unit 17 superimposes a polarity-inversed image (phase modulation component a) of the phase modulated image $\hat{I_D}$ to the original image $I_L = I_C$ to obtain and output an added image $I_R$ (image A), and the superposition unit 18 further receives the original image $I_L = I_C$ and the phase modulated image $\hat{I_D}$ and superimposes the original image $I_L = I_C$ and the phase modulated image $\hat{I_D}$ (phase modulation component b) to obtain and output an added image $I_L$ (image B).

Modification Example 3

When the original image $I_L = I_C$ and the original image $I_{R'}$ are color images, processes of steps S221, S222, S211, S212, S224, S225, S24, S25, S23, S15, S122, S16, S124, S17, S18 are performed for each color channel (R, G, and B channels), and the added image $I_R$ (image A) and the added image $I_L$ (image B) of all color channels may be output. The process of step S24 may be performed on only one of the channels. Modification Examples 1 and 2 may be performed even when the original image $I_L = I_C$ is a color image, and the process of Modification Example 2 in this case is performed for each color channel.

Modification Example 4

The image generation unit 20 sets an image obtained by shifting the phase of the original image $I_L = I_C$ in the positive direction by $0.5\pi$ [rad] as a phase-shifted image $S_{C\lambda,\mu}$ (Equation (2)).

However, an image obtained by shifting the phase of the original image $I_L = I_C$ in the positive direction by an amount close to $0.5\pi$ may be used as the phase shift image S In this case, the phase of the polarity-inversed image (phase modulation component a) of the phase modulated image $I_D$ corresponding to the region where the value of the disparity map is positive (crossed disparity) is obtained by shifting the phase of the original image $I_L = I_C$ by an amount close to $0.5\pi$ [rad] in the negative direction, and the phase of the phase modulated image $I_D$ (phase modulation component b) corresponding to the region where the value of the disparity map is positive (crossed disparity) is obtained by shifting the phase of the original image $I_L = I_C$ by an amount close to $0.5\pi$ [rad] in the negative direction. Further, instead of using the polarity-inversed image of the phase modulated image $I_D$ as the phase modulation component a and the phase modulated image $I_D$ as the phase modulation component b, the polarity-inversed image of the phase modulated image $I_D$ may be the phase modulation component a, and an image near the opposite phase of the phase modulation component a may be the phase modulation component b.

Others

As described in (image generation unit 20), a phase modulated image having a phase difference of $\pi/2$ is generated by using Equation (2). By using a predetermined equation instead of Equation (2), a phase modulated image having any phase difference can be generated.

The image generation unit 20 has been described in detail including modification examples in the above. Note that, in a case where K=2, $\varphi 1=\pi/4$, and $\varphi 2=\pi/2$, the relationship between the viewpoint movement and the fluctuation in image quality is the same as in the image generation unit 10 (see FIG. 5).

According to the disclosure of the present embodiment, it is possible to generate any number of pseudo viewpoint images at a viewpoint position different from the viewpoint position of the viewpoint image I, from the viewpoint image I and the adjacent viewpoint image I'. Further, by arranging the pseudo viewpoint image and the viewpoint image I in a sequence of the phase difference and projecting with the projector, it is possible to suppress unpleasant feelings associated with fluctuation in image quality caused by the viewer's viewpoint movement.

Third Embodiment

Figure 9:
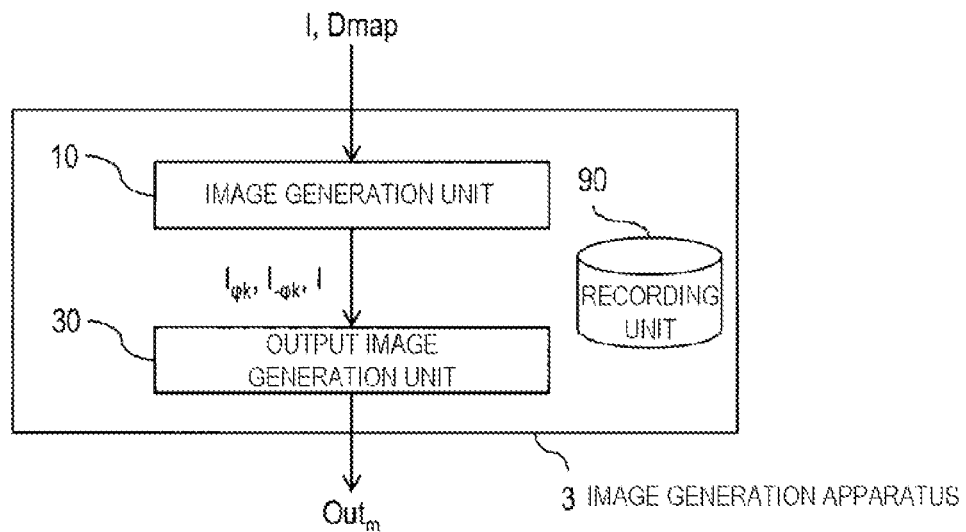
FIG. 9 is a block diagram illustrating a configuration of an image generation apparatus 3.
Figure 10:
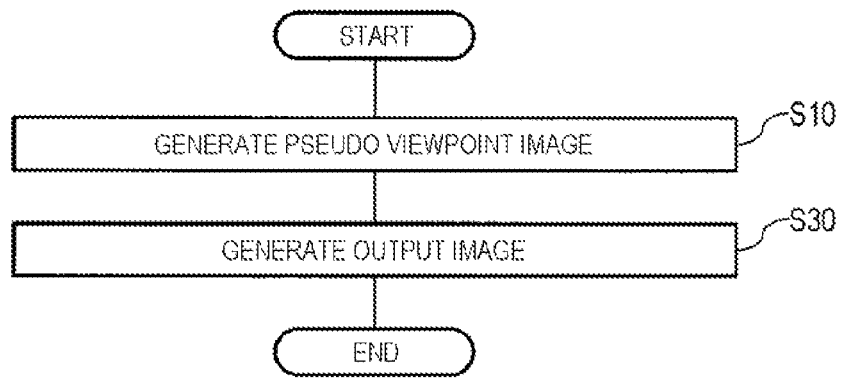
FIG. 10 is a flowchart illustrating an operation of the image generation apparatus 3.

Hereinafter, an image generation apparatus 3 will be described with reference to FIG. 9 and FIG. 10. FIG. 9 is a block diagram illustrating a configuration of the image generation apparatus 3. FIG. 10 is a flowchart illustrating the operation of the image generation apparatus 3. As illustrated in FIG. 9, the image generation apparatus 3 includes an image generation unit 10, an output image generation unit 30, and a recording unit 90. The recording unit 90 is a component configured to appropriately record information required for processing of the image generation apparatus 3.

The image generation apparatus 3 receives, as an input, the viewpoint image I and the disparity map Dmap corresponding to the viewpoint image I, and generates and outputs 2K (K is an integer of 2 or greater) output image $\text{Out}_m$ ($1 \leq m \leq 2K-1$) from the viewpoint image I and the disparity map Dmap. Here, the output image $\text{Out}_m$ is an image projected on a screen using a projector (projection apparatus).

The operation of the image generation apparatus 3 will be described in accordance with FIG. 10.

In step S10, the image generation unit 10 receives, as an input, the viewpoint image I and a disparity map Dmap of the viewpoint image I, generates pseudo viewpoint image $I_{\varphi k}, I_{-\varphi k}$, from the viewpoint image I and the disparity map Dmap for k=1, . . . , K, and outputs the pseudo viewpoint images $I_{\varphi k}, I_{-\varphi k}$ ($1 \leq k \leq K$) and the viewpoint image I. Here, $\varphi k (1 \leq k \leq K)$ represents the phase difference between the viewpoint image I and the disparity inducing edge $D_{\varphi k}$, and is a real number satisfying $0 < \varphi 1 < \ldots < \varphi K \leq \pi/2$. In the following, it is presented that φ0=0 and $I_{\varphi 0}$=I, and the viewpoint image I may be referred to as a pseudo viewpoint image $I_{\varphi 0}$.

Figure 11:
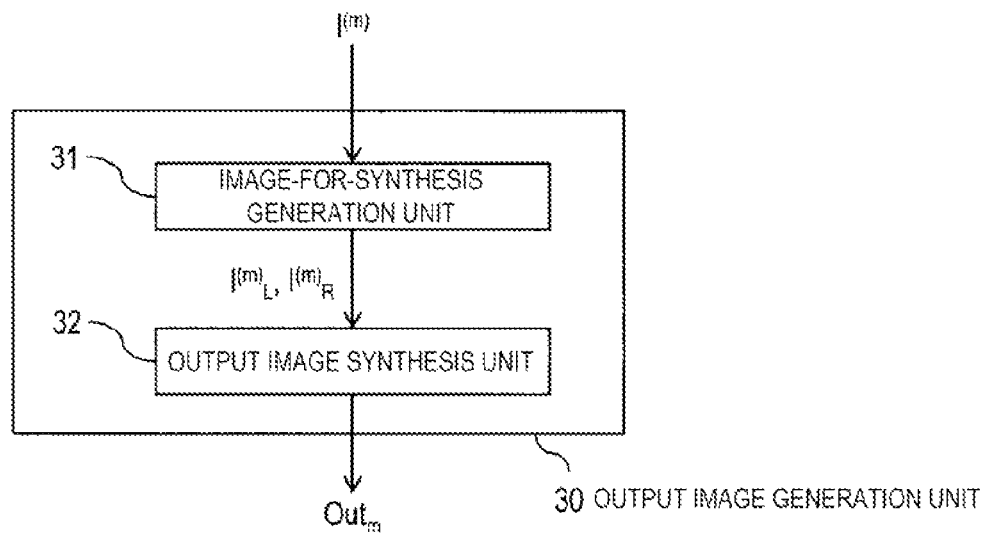
FIG. 11 is a block diagram illustrating a configuration of an output image generation unit 30.
Figure 12:
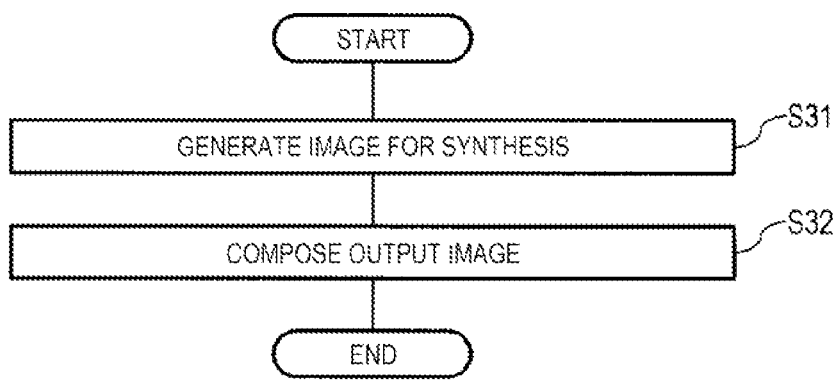
FIG. 12 is a flowchart illustrating an operation of the output image generation unit 30.

In step S30, the output image generation unit 30 receives, as an input, the pseudo viewpoint image $I_{\varphi k}$, $I_{-\varphi k}$ (1≤k≤K) and the viewpoint image I, which are output at S10, and generates and outputs an output image $Out_m$ (1≤m≤2K-1). The pseudo viewpoint images $I_{\varphi k}$ and $I_{-\varphi k}$ (1≤k≤K) and the viewpoint image I are arranged in the sequence of $I_{\varphi K}$, $I_{\varphi(K-1)}$, . . . , $I_{\varphi 1}$, $I_{\varphi 0}$(=I), $I_{-\varphi 1}$, . . . , and $I_{-\varphi K}$ to make $I^{(1)}$, $I^{(2)}$, . . . , $I^{(K)}$, $I^{(K+1)}$, $I^{(K+2)}$, . . . , and $I^{(2K+1)}$. That is, the output image generation unit 30 receives the pseudo viewpoint image $I^{(m)}$ (1≤m≤2K+1) as an input. Hereinafter, an output image generation unit 30 will be described with reference to FIG. 11 and FIG. 12. As illustrated in FIG. 11, the output image generation unit 30 includes an image-for-synthesis generation unit 31 and an output image synthesis unit 32. The operation of the output image generation unit 30 will be described in accordance with FIG. 12.

Figure 13:
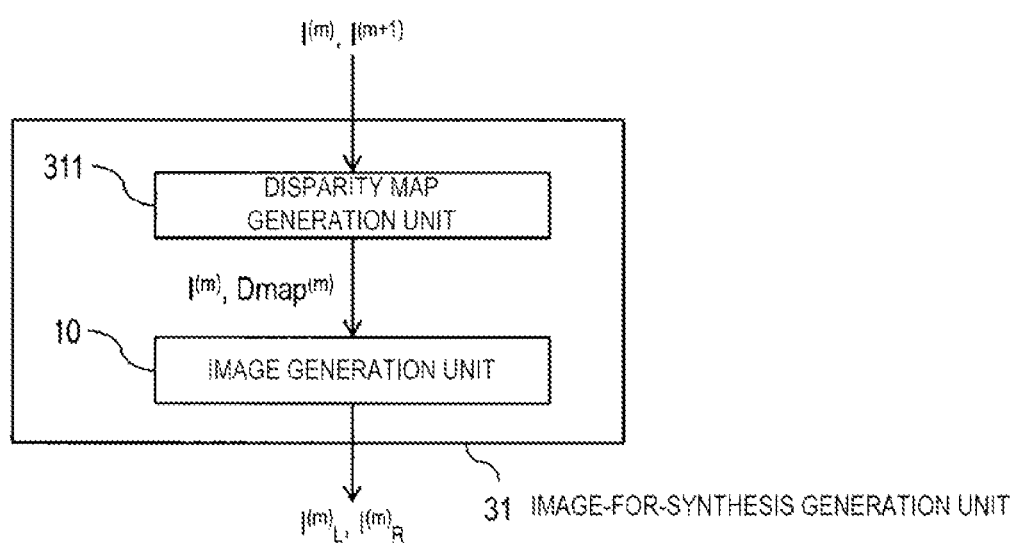
FIG. 13 is a block diagram illustrating a configuration of an image-for-synthesis generation unit 31.

In step S31, the image-for-synthesis generation unit 31 receives the pseudo viewpoint image $I^{(m)}$ (1≤m≤2K+1) output in S10 as an input, generates images for synthesis $I^{(m)}_L$ and $I^{(m)}_R$, for m=1, . . . , 2K, from the pseudo viewpoint image $I^{(m)}$ and the pseudo viewpoint image $I^{(m+1)}$ and outputs the image for synthesis $I^{(m)}_L$ and $I^{(m)}_R$ (1≤m≤2K). For example, the image-for-synthesis generation unit 31 may generate the images for synthesis $I^{(m)}_L$, $I^{(m)}_R$ by the same procedure as the image generation unit 20. In this case, the image-for-synthesis generation unit 31 is a component having the same configuration as the image generation unit 20 (see FIG. 8). Further, after generating the disparity map $Dmap^{(m)}$ of the pseudo viewpoint image $I^{(m)}$ from the pseudo viewpoint image $I^{(m)}$ and the pseudo viewpoint image $I^{(m+1)}$ the image-for-synthesis generation unit 31 may generate images for synthesis $I^{(m)}_L$, $I^{(m)}_R$, from the pseudo viewpoint image $I^{(m)}$ and the disparity map $Dmap^{(m)}$, by the same procedure as that of the image generation unit 10. In this case, the image-for-synthesis generation unit 31 is a component including the disparity-map generation unit 311 and the image generation unit 10, as illustrated in FIG. 13. That is, the disparity map generation unit 311 generates the disparity map $Dmap^{(m)}$ of the pseudo viewpoint image $I^{(m)}$ from the pseudo viewpoint image $I^{(m)}$ and the pseudo viewpoint image $I^{(m+1)}$, and outputs the pseudo viewpoint image $I^{(m)}$ and the disparity map $Dmap^{(m)}$. In any case, in step S31, the image-for-synthesis generation unit 31 generates a disparity inducing edge $D^{(m)}$ whose the phase difference from the pseudo viewpoint image $I^{(m)}$ is a predetermined value (for example, π/2), from the pseudo viewpoint image $I^{(m)}$ and the pseudo viewpoint image $I^{(m+1)}$, for m=1, . . . , 2K, generates an image for synthesis $I^{(m)}_L$ by adding the disparity inducing edge $D^{(m)}$ to the pseudo viewpoint image $I^{(m)}$ and generates an image for synthesis $I^{(m)}_R$ by adding the polarity-inversed image of the disparity inducing edge $D^{(m)}$ to the pseudo viewpoint image $I^{(m)}$.

In step S32, the output image synthesis unit 32 receives the images for synthesis $I^{(m)}_R$ and $I^{(m)}_L$ (1≤m≤2K) generated in S31 as an input, synthesizes the output image $Out_m$, from the images for synthesis $I^{(m)}_R$ and $I^{(m+1)}_L$ for m=1, . . . , 2K-1, and outputs the output image $Out_m$ (1≤m≤2K-1). For example, an output image may obtained by adding the RGB values of the respective pixels of the image for synthesis $I^{(m)}_R$ and the image for synthesis $I^{(m+1)}_L$ and dividing the sum by 2 (averaged value) as a pixel value.

The image generation apparatus 3 may further include a projection unit (not illustrated) that projects the output images $Out_m$ (1≤m≤2K-1) output in S30. The projection unit arranges the output images $Out_m$ (1≤m≤2K-1) in the sequence of $Out_1$, $Out_2$, . . . , and $Out_{2K-1}$, and in other words, in the sequence of the viewpoint positions, and projects the output images on the screen.

A description will be made below with reference to FIG. 14. The output image $Out_1$ is an image obtained by synthesizing the images for synthesis $I^{(1)}_R$ and $I^{(2)}_L$. Further, the output image $Out_2$ is an image obtained by synthesizing the images for synthesis $I^{(2)}_R$ and $I^{(3)}_L$. At the viewpoint position A, the output image $Out_1$ is perceived. On the other hand, at the viewpoint position B, the output image $Out_1$ and the output image $Out_2$ are synthesized and visually recognized (simultaneously viewed). That is, at the viewpoint position B, the phase modulation component is canceled and the image for synthesis $I^{(2)}$ is mainly perceived. The image perceived at the viewpoint position B includes, as components that may be degraded, an image for synthesis $I^{(1)}_R$ used for synthesizing the output image $Out_1$ at the viewpoint position A and an image for synthesis $I^{(3)}_L$ used for synthesizing the output image $Out_3$ at the viewpoint position C, which are perceived. However, the influence of these components that may be degraded is less than half of the linear blending in the related art, so that the degradation in image quality may be mitigated. As a result, a viewer hardly experiences unpleasant feelings associated with fluctuation in image quality due to the viewer's viewpoint moving from A to C.

As can be understood from the above description, when the output image $Out_m$ and the output image $Out_{m+1}$ are synthesized and visually recognized (visually recognized simultaneously), an image in which the disparity inducing edge $D^{(m+1)}$ as the phase modulation component is canceled out (pseudo viewpoint image $I^{(m+1)}$) is mainly perceived. In other words, the output image generation unit 30 generates an output image $Out_m$ (1≤m≤2K-1) from the pseudo viewpoint image $I^{(m)}$ (1≤m≤2K+1), and the output image $Out_m$ and the output image $Out_{m+1}$ (1≤m≤2K-2) includes a phase modulation component that is canceled out when synthesized and visually recognized (simultaneously viewed).

According to the disclosure of the present embodiment, it is possible to suppress unpleasant feelings associated with fluctuation in image quality caused by the viewer's viewpoint movement.

Fourth Embodiment

Figure 15:
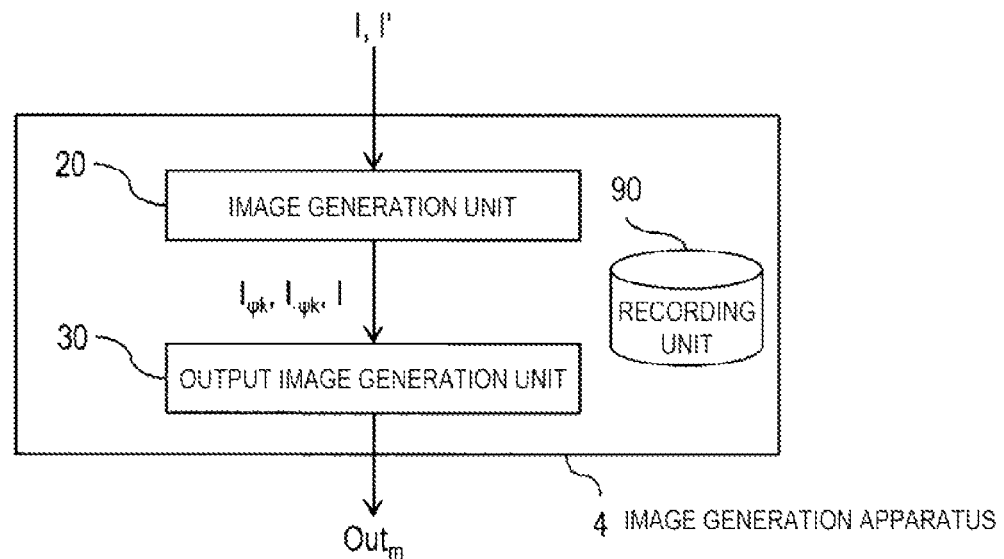
FIG. 15 is a block diagram illustrating a configuration of an image generation apparatus 4.
Figure 16:
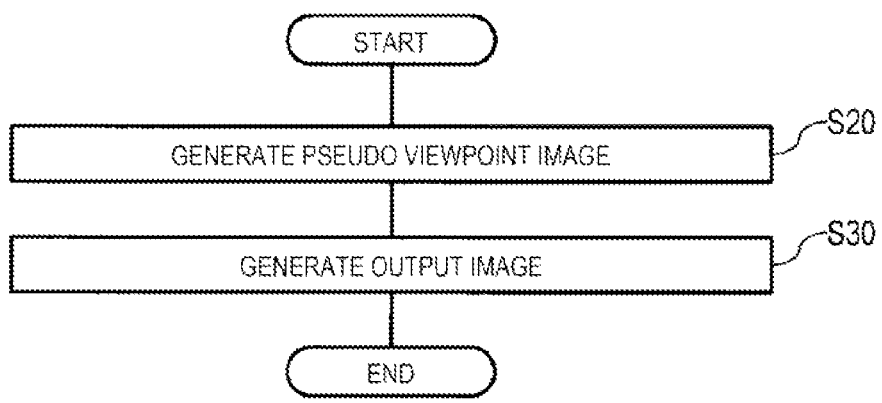
FIG. 16 is a flowchart illustrating an operation of the image generation apparatus 4.

Hereinafter, an image generation apparatus 4 will be described with reference to FIG. 15 and FIG. 16. FIG. 15 is a block diagram illustrating a configuration of the image generation apparatus 4. FIG. 16 is a flowchart illustrating the operation of the image generation apparatus 4. As illustrated in FIG. 15, the image generation apparatus 4 includes an image generation unit 20, an output image generation unit 30, and a recording unit 90. The recording unit 90 is a component configured to appropriately record information required for processing of the image generation apparatus 4.

The image generation apparatus 4 receives the viewpoint image I and the adjacent viewpoint image I' (that is, the viewpoint image I and the viewpoint image I' captured from the viewpoint position adjacent to the viewpoint position where the viewpoint image I is captured) as inputs, and generates and outputs 2K (K is an integer of 2 or more) output image $Out_m$ (1≤m≤2K-1) from the viewpoint image I and the viewpoint image I'. Here, the output image $Out_m$ is an image projected on a screen using a projector (projection apparatus).

The operation of the image generation apparatus 4 will be described in accordance with FIG. 16.

In step S20, the image generation unit 20 receives, as an input, the viewpoint image I and the adjacent viewpoint image I', generates a pseudo viewpoint image $I_{\varphi k}$ and $I_{-\varphi k}$ from the viewpoint image I and the viewpoint image I', k=1, K, and outputs the pseudo viewpoint image $I_{\varphi k}$ and $I_{-\varphi k}$ (1≤k≤K) and the viewpoint image I. Here, φk(1≤k≤K) represents the phase difference between the viewpoint image I and the disparity inducing edge $D_{\varphi k}$, and is a real number satisfying 0<φ1< ... <φK≤π/2. In the following, it is presented that φ0=0 and $I_{\varphi 0}$=I, and the viewpoint image I may be referred to as a pseudo viewpoint image $I_{\varphi 0}$.

In step S30, the output image generation unit 30 receives the pseudo viewpoint image $I_{\varphi k}$, $I_{-\varphi k}$ (1≤k≤K) and the viewpoint image I, which are output at S20, and generates and outputs an output image $Out_m$ (1≤m≤2K−1).

The image generation apparatus 4 may further include a projection unit (not illustrated) that projects the output images $Out_m$ (1≤m≤2K−1) output in S30. The projection unit arranges the output images $Out_m$ (1≤m≤2K−1) in the sequence of $Out_1$, $Out_2$, ..., and $Out_{2K-1}$, and in other words, in the sequence of the viewpoint positions, and projects the output images on the screen.

Figure 14:
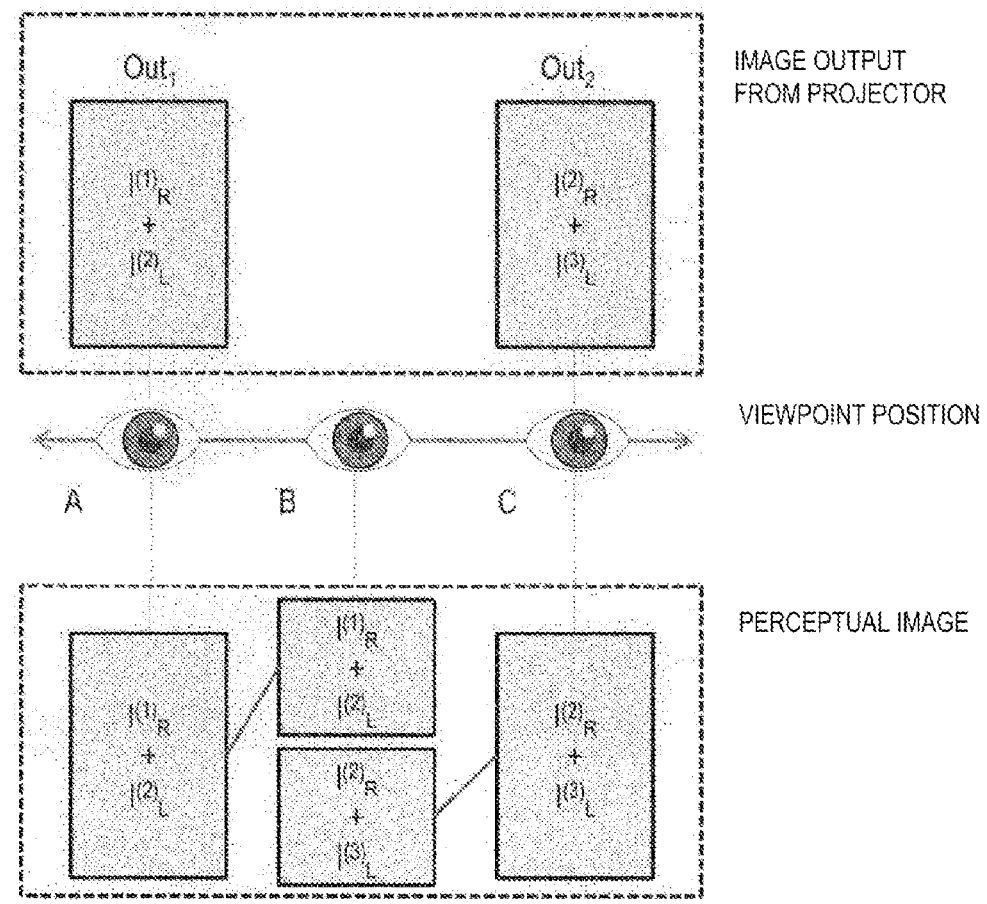
FIG. 14 is a diagram illustrating the technology of the present application.

The output image $Out_m$ (1≤m≤2) is an image obtained by synthesizing the images for synthesis $I^{(m)}_R$ and $I^{(m+1)}_L$, so that as in the image generation apparatus 3, a viewer hardly experiences unpleasant feelings associated with the fluctuation in image quality caused by the viewpoint of the viewer moving from A to C (see FIG. 14).

In other words, a sequence in which the pseudo viewpoint images $I_{\varphi k}$ and $I_{-\varphi k}$ (1≤k≤K) and the viewpoint image I are arranged in the sequence of $I_{\varphi K}$, $I_{\varphi(K-1)}$, ..., $I_{\varphi 1}$, $I_{\varphi 0}$ (=I), $I_{-\varphi 1}$, ..., and $I_{-\varphi K}$ is set as $I^{(1)}, I^{(2)}, \ldots, I^{(k)}, I^{(K+1)}, I^{(K+2)}, \ldots, I^{(2K+1)}$, and the output image generation unit 30 generates output images $Out_m$ (1≤m≤2K−1) from the pseudo viewpoint images $I^{(m)}$ (1≤m≤2K+1), and the output image $Out_m$ and the output image $Out_{m+1}$ (1≤m≤2K−2) include a phase modulation components that are canceled out when synthesized and visually recognized (visually recognized at the same time).

According to the disclosure of the present embodiment, it is possible to suppress unpleasant feelings associated with fluctuation in image quality caused by the viewer's viewpoint movement.

Fifth Embodiment

Figure 17:
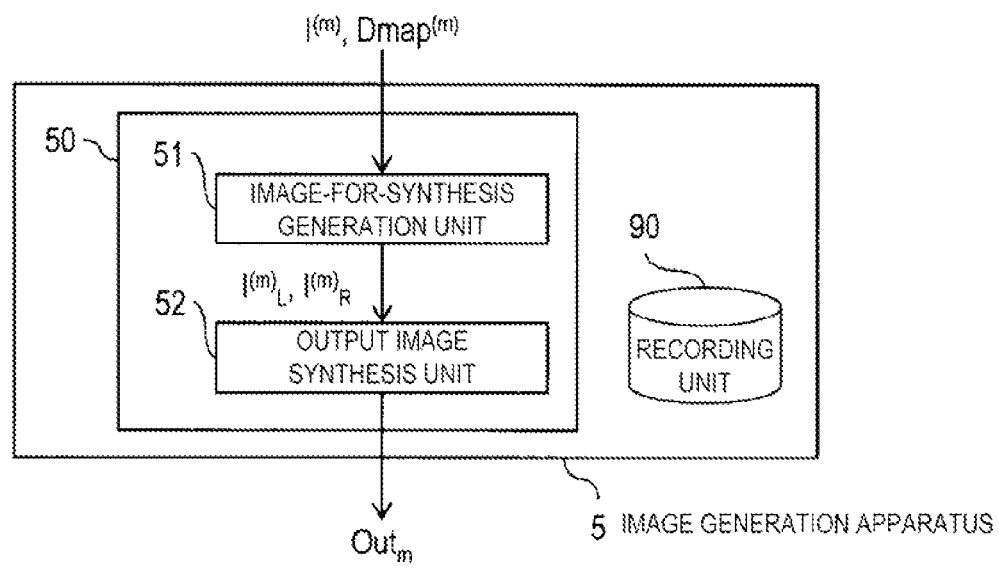
FIG. 17 is a block diagram illustrating a configuration of an image generation apparatus 5.
Figure 18:
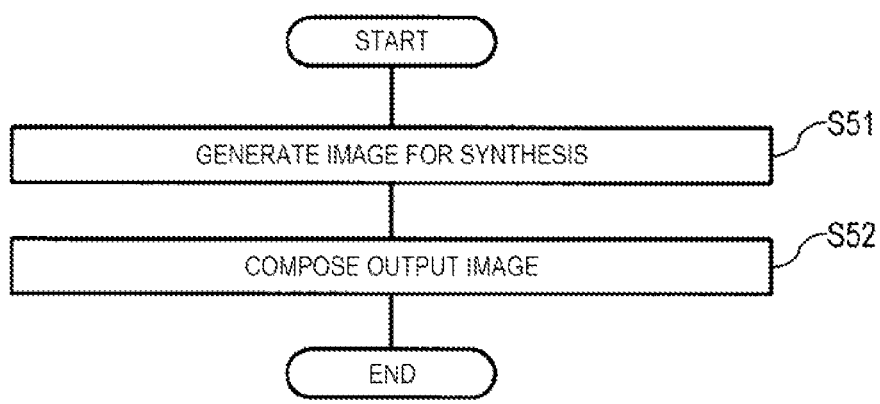
FIG. 18 is a flowchart illustrating an operation of the image generation apparatus 5.

Hereinafter, an image generation apparatus 5 will be described with reference to FIG. 17 and FIG. 18. FIG. 17 is a block diagram illustrating a configuration of the image generation apparatus 5. FIG. 18 is a flowchart illustrating the operation of the image generation apparatus 5. As illustrated in FIG. 17, the image generation apparatus 5 includes an output image generation unit 50 and a recording unit 90. The output image generation unit 50 includes an image-for-synthesis generation unit 51 and an output image synthesis unit 52. The recording unit 90 is a component configured to appropriately record information required for processing of the image generation apparatus 5.

The image generation apparatus 5 receives, as inputs, a set of M viewpoint images $I^{(m)}$ and the disparity map $Dmap^{(m)}$ corresponding to the viewpoint images $I^{(m)}$ (1≤m≤M, M is an integer of 3 or greater), and generates and outputs M−1 output images $Out_m$ (1≤m≤M−1). Here, the viewpoint images $I^{(1)}, I^{(2)}, \ldots, I^{(M)}$ are a sequence of viewpoint images arranged in the sequence of the viewpoint positions. The output image $Out_m$ is an image projected on a screen using a projector (projection apparatus). The interval between the adjacent viewpoint image $I^{(m)}$ and viewpoint image $I^{(m+1)}$ is the same as the interval between the adjacent output image $Out_m$ and the output image $Out_{m+1}$, that is, the placement interval between the projectors that projects the output image $Out_m$.

The operation of the image generation apparatus 5 will be described in accordance with FIG. 18.

In step S50, the output image generation unit 50 receives the viewpoint image $I^{(m)}$ and the disparity map $Dmap^{(m)}$ (1≤m≤M) as an input, and generates and outputs an output image $Out_m$ (1≤m≤M−1).

In step S51, the image-for-synthesis generation unit 51 receives the viewpoint image $I^{(m)}$ and the disparity map $Dmap^{(m)}$ (1≤m≤M) as inputs, generates images for synthesis $I^{(m)}_L$, $I^{(m)}_R$, from the viewpoint image $I^{(m)}$ and the disparity map $Dmap^{(m)}$, for m=1, ..., M, and outputs the images for synthesis $I^{(m)}_L$, $I^{(m)}_R$ (1≤m≤M). For example, the image-for-synthesis generation unit 51 may generate the images for synthesis $I^{(m)}_L$, $I^{(m)}_R$ by the same procedure as the image generation unit 10. That is, the added images $I_L$, $I_R$ are set to the images for synthesis $I^{(m)}_L$, $I^{(m)}_R$. In this case, the image-for-synthesis generation unit 51 is a component having the same configuration as the image generation unit 10 (see FIG. 4), and repeats a generation process on a set of M viewpoint images $I^{(m)}$ and disparity maps Dmap on). In other words, in step S51, the image-for-synthesis generation unit 51 generates a disparity inducing edge $D^{(m)}$ whose the phase difference from the viewpoint image $I^{(m)}$ is a predetermined value (for example, π/2), from the viewpoint image $I^{(m)}$ and the disparity map $Dmap^{(m)}$, for m=1, ..., M, generates an image for synthesis $I^{(m)}_L$ by adding the disparity inducing edge $D^{(m)}$ to the viewpoint image $I^{(m)}$ and generates an image for synthesis $I^{(m)}_R$ by adding the polarity-inversed image of the disparity inducing edge $D^{(m)}$) to the viewpoint image $I^{(m)}$.

In step S52, the output image synthesis unit 52 receives the images for synthesis $I^{(m)}_R$ and $I^{(m)}_L$ (1≤m≤M) generated in S51 as inputs, synthesizes the output image $Out_m$, from the images for synthesis $I^{(m)}_R$ and $I^{(m+1)}_L$ for m=1, ..., M−1, and outputs the output image $Out_m$ (1≤m≤M−1). The procedure for synthesizing the output image $Out_m$ may be the same as that of the output image synthesis unit 32, and the generation process is repeated for a set of M−1 images for synthesis $I^{(m)}_R$ and $I^{(m+1)}_L$.

In other words, the output image generation unit 50 generates an output image $Out_m$ (1≤m≤M−1) from the viewpoint image $I^{(m)}$ and the disparity map $Dmap^{(m)}$ (1≤m≤M), and the output image $Out_m$ and the output image $Out_{m+1}$ (1≤m≤M−2) includes a phase modulation component that is canceled out when synthesized and visually recognized (simultaneously viewed).

The image generation apparatus 5 may further include a projection unit (not illustrated) that projects the output images $Out_m$ (1≤m≤M−1) output in S50. The projection unit arranges the output images $Out_m$ (1≤m≤M−1) in the sequence of $Out_1$, $Out_2$, ..., and $Out_{M-1}$, and in other words, in the sequence of the viewpoint positions, and projects the output images on the screen.

According to the disclosure of the present embodiment, it is possible to suppress unpleasant feelings associated with fluctuation in image quality caused by the viewer's viewpoint movement.

Sixth Embodiment

Figure 19:
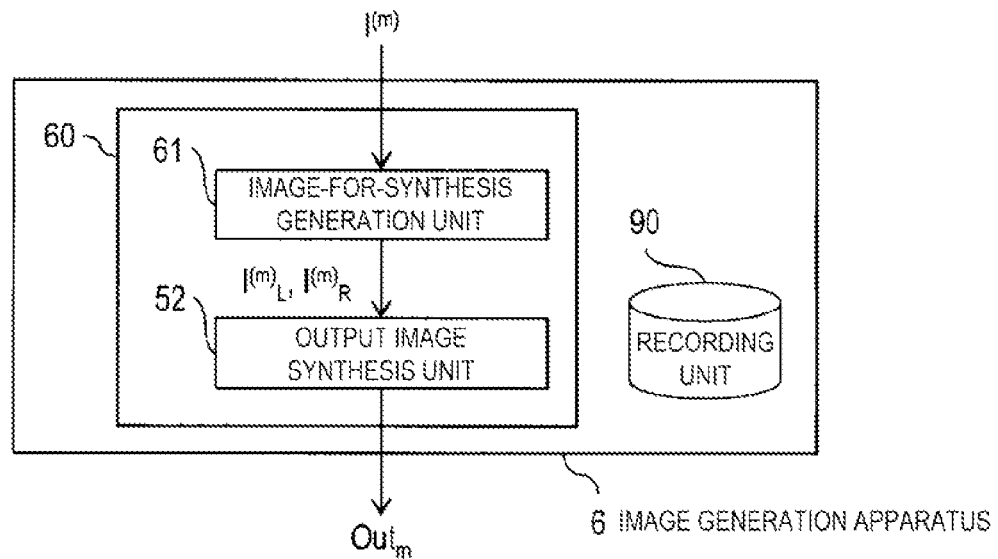
FIG. 19 is a block diagram illustrating a configuration of an image generation apparatus 6.
Figure 20:
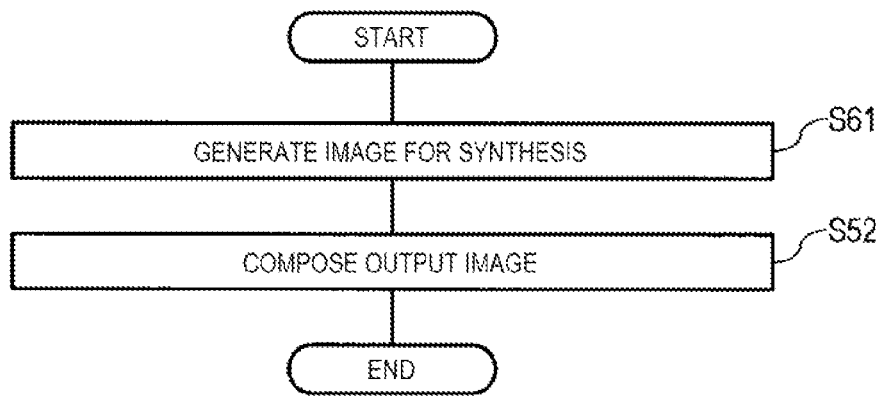
FIG. 20 is a flowchart illustrating an operation of the image generation apparatus 6.

Hereinafter, an image generation apparatus 6 will be described with reference to FIG. 19 and FIG. 20. FIG. 19 is a block diagram illustrating a configuration of the image generation apparatus 6. FIG. 20 is a flowchart illustrating the operation of the image generation apparatus 6. As illustrated in FIG. 19, the image generation apparatus 6 includes an output image generation unit 60 and a recording unit 90. The output image generation unit 60 includes an image-for-synthesis generation unit 61 and an output image synthesis unit 52. The recording unit 90 is a component configured to appropriately record information required for processing of the image generation apparatus 6.

The image generation apparatus 6 receives the viewpoint image $I^{(m)}$ ($1 \leq m \leq M+1$, where M is an integer of 3 or more), generates and outputs M−1 output images $Out_m$ ($1 \leq m \leq M-1$). Here, the viewpoint images $I^{(1)}, I^{(2)}, \ldots, I^{(M)}$ are a sequence of viewpoint images arranged in the sequence of the viewpoint positions. The output image $Out_m$ is an image projected on a screen using a projector (projection apparatus). The interval between the adjacent viewpoint image $I^{(m)}$ and viewpoint image $I^{(m+1)}$ is the same as the interval between the adjacent output image $Out_m$ and the output image $Out_{m+1}$, that is, the placement interval between the projectors that projects the output image $Out_m$.

The operation of the image generation apparatus 6 will be described in accordance with FIG. 20.

In step S60, the output image generation unit 60 receives the viewpoint image $I^{(m)}$ ($1 \leq m \leq M+1$) as an input, and generates and outputs an output image $Out_m$ ($1 \leq m \leq M-1$).

In step S61, the image-for-synthesis generation unit 61 receives the viewpoint image $I^{(m)}$ ($1 \leq m \leq M+1$) as an input, generates images for synthesis $I^{(m)}{}_L$, $I^{(m)}{}_R$, from the viewpoint image $I^{(m)}$ and the adjacent viewpoint images $I^{(m+1)}$, for m=1, . . . , M, and outputs the images for synthesis $I^{(m)}{}_L$, $I^{(m)}{}_R$ ($1 \leq m \leq M$). For example, the image-for-synthesis generation unit 61 may generate the images for synthesis $I^{(m)}{}_L$, $I^{(m)}{}_R$ by the same procedure as the image generation unit 20. That is, the added images $I_L$, $I_R$ are set to the images for synthesis $I^{(m)}{}_L$, $I^{(m)}{}_R$. In this case, the image-for-synthesis generation unit 61 is a component having the same configuration as the image generation unit 20 (see FIG. 8), and repeats a generation process on a set of M viewpoint images $I^{(m)}$ and $I^{(m+1)}$. As another method, for example, the image-for-synthesis generation unit 61 may generate the images for synthesis $I^{(m)}{}_L$, $I^{(m)}{}_R$ by the same procedure as the image-for-synthesis generation unit 31. In this case, the image-for-synthesis generation unit 61 is a component having the same configuration as the image-for-synthesis generation unit 31 (see FIG. 13), and repeats a generation process on a set of M viewpoint images $I^{(m)}$ and $I^{(m+1)}$. In any case, in step S61, the image-for-synthesis generation unit 61 generates a disparity inducing edge $D^{(m)}$ whose the phase difference from the viewpoint image $I^{(m)}$ is a predetermined value (for example, π/2), from the viewpoint image $I^{(m)}$ and the neighboring viewpoint image $I^{(m+1)}$, for m=1, . . . , M, generates an image for synthesis $I^{(m)}{}_L$ by adding the disparity inducing edge $D^{(m)}$ to the viewpoint image $I^{(m)}$, and generates an image for synthesis $I^{(m)}{}_R$ by adding the polarity-inversed image of the disparity inducing edge $D^{(m)}$ to the viewpoint image $I^{(m)}$.

In step S52, the output image synthesis unit 52 receives the images for synthesis $I^{(m)}{}_R$ and $I^{(m)}{}_L$ ($1 \leq m \leq M$) generated in S61 as an input, synthesizes the output image $Out_m$ from the images for synthesis $I^{(m)}{}_R$ and $I^{(m+1)}{}_L$ for m=1, . . . , M−1, and outputs the output image $Out_m$ ($1 \leq m \leq M-1$).

In other words, the output image generation unit 60 generates an output image $Out_m$ ($1 \leq m \leq M-1$) from the viewpoint image $I^{(m)}$ ($1 \leq m \leq M+1$), and the output image $Out_m$ and the output image $Out_{m+1}$ ($1 \leq m \leq M-2$) includes a phase modulation component that is canceled out when synthesized and visually recognized (simultaneously viewed).

The image generation apparatus 6 may further include a projection unit (not illustrated) that projects the output images $Out_m$ ($1 \leq m \leq M-1$) output in S60. The projection unit arranges the output images $Out_m$ ($1 \leq m \leq M-1$) in the sequence of $Out_1$, $Out_2$, . . . , and $Out_{M-1}$, and in other words, in the sequence of the viewpoint positions, and projects the output images on the screen.

According to the disclosure of the present embodiment, it is possible to suppress unpleasant feelings associated with fluctuation in image quality caused by the viewer's viewpoint movement.

Seventh Embodiment

Figure 21:
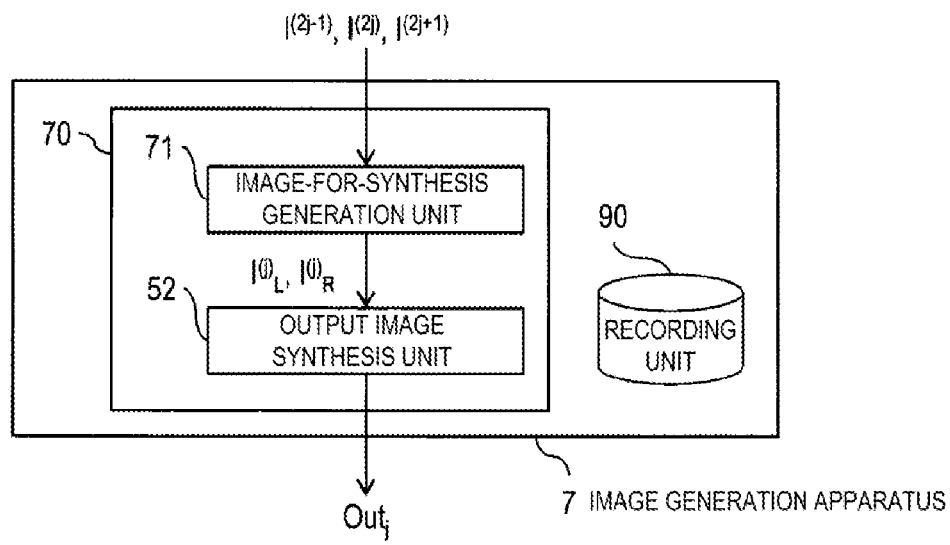
FIG. 21 is a block diagram illustrating a configuration of an image generation apparatus 7.
Figure 22:
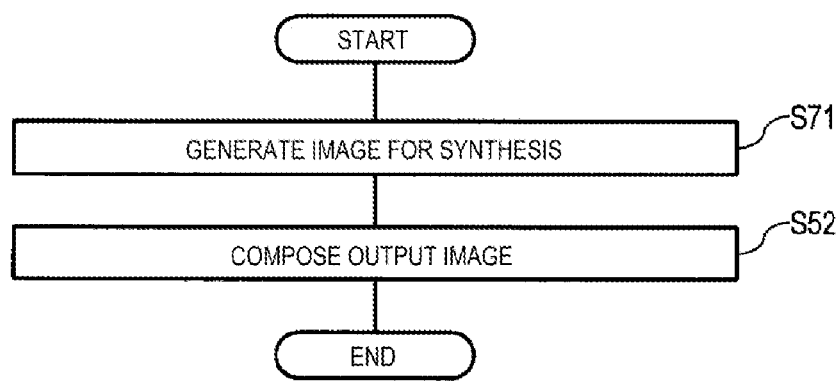
FIG. 22 is a flowchart illustrating an operation of the image generation apparatus 7.

Hereinafter, an image generation apparatus 7 will be described with reference to FIG. 21 and FIG. 22. FIG. 21 is a block diagram illustrating a configuration of the image generation apparatus 7. FIG. 22 is a flowchart illustrating the operation of the image generation apparatus 7. As illustrated in FIG. 21, the image generation apparatus 7 includes an output image generation unit 70 and a recording unit 90. The output image generation unit 70 includes an image-for-synthesis generation unit 71 and an output image synthesis unit 52. The recording unit 90 is a component configured to appropriately record information required for processing of the image generation apparatus 7.

Figure 23:
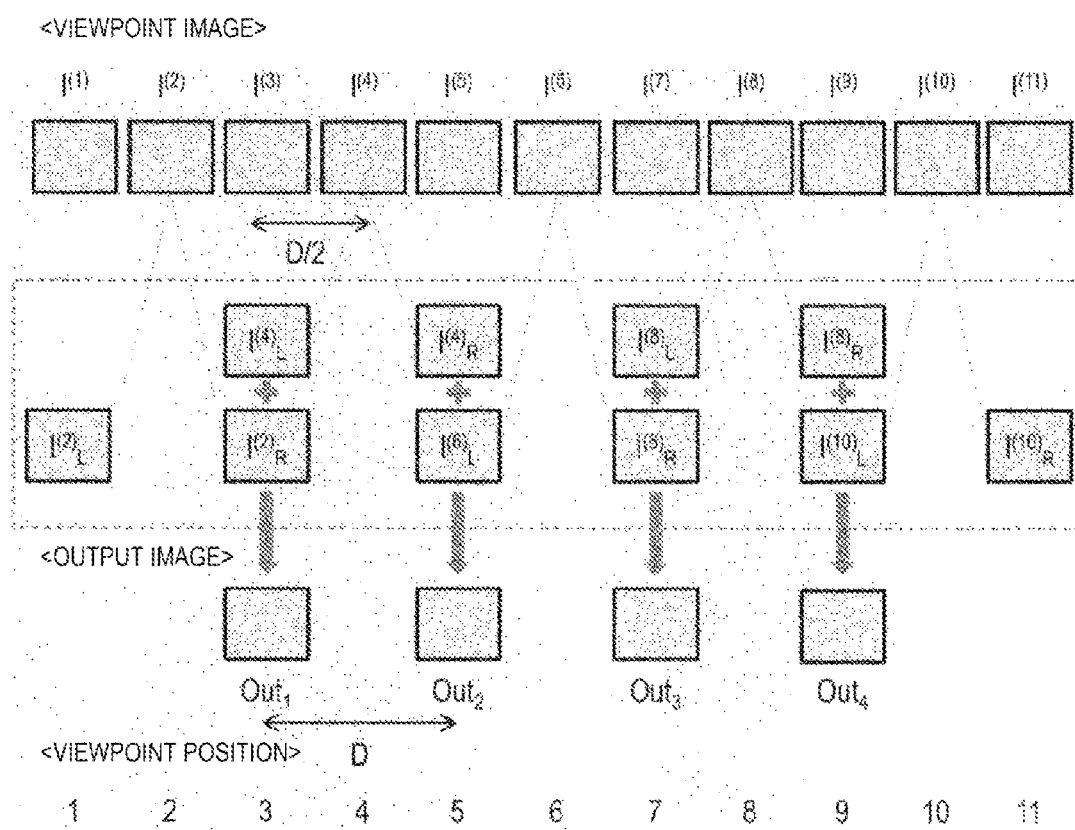
FIG. 23 is a diagram illustrating a relationship between a viewpoint image and an output image when J=5.

The image generation apparatus 7 receives the viewpoint image $I^{(j)}$ ($1 \leq j \leq 2J+1$, where J is an integer of 3 or more), generates J−1 output images $Out_j$ ($1 \leq j \leq J-1$), and outputs the generated images. Here, it is a sequence of viewpoint images in which the viewpoint images $I^{(1)}, I^{(2)}, \ldots, I^{(2J+1)}$ are arranged in the sequence of the viewpoint positions. The output image $Out_j$ is an image projected on a screen using a projector (projection apparatus). The interval between two adjacent viewpoint images is the same as the interval between two adjacent output images, that is, ½ of the placement interval between projectors that project the output image $Out_j$. FIG. 23 is a diagram illustrating a positional relationship between the viewpoint images $I^{(1)}$ to $I^{(11)}$ and the output images $Out_1$ to $Out_4$ when J=5. That is, the projectors are placed only at the viewpoint positions 3, 5, 7, and 9. Note that D is a placement interval of the projector.

The operation of the image generation apparatus 7 will be described in accordance with FIG. 22.

In step S70, the output image generation unit 70 receives the viewpoint image $I^{(j)}$ ($1 \leq j \leq 2J+1$) as an input, and generates and outputs an output image $Out_j$ ($1 \leq j \leq J-1$).

Figure 24:
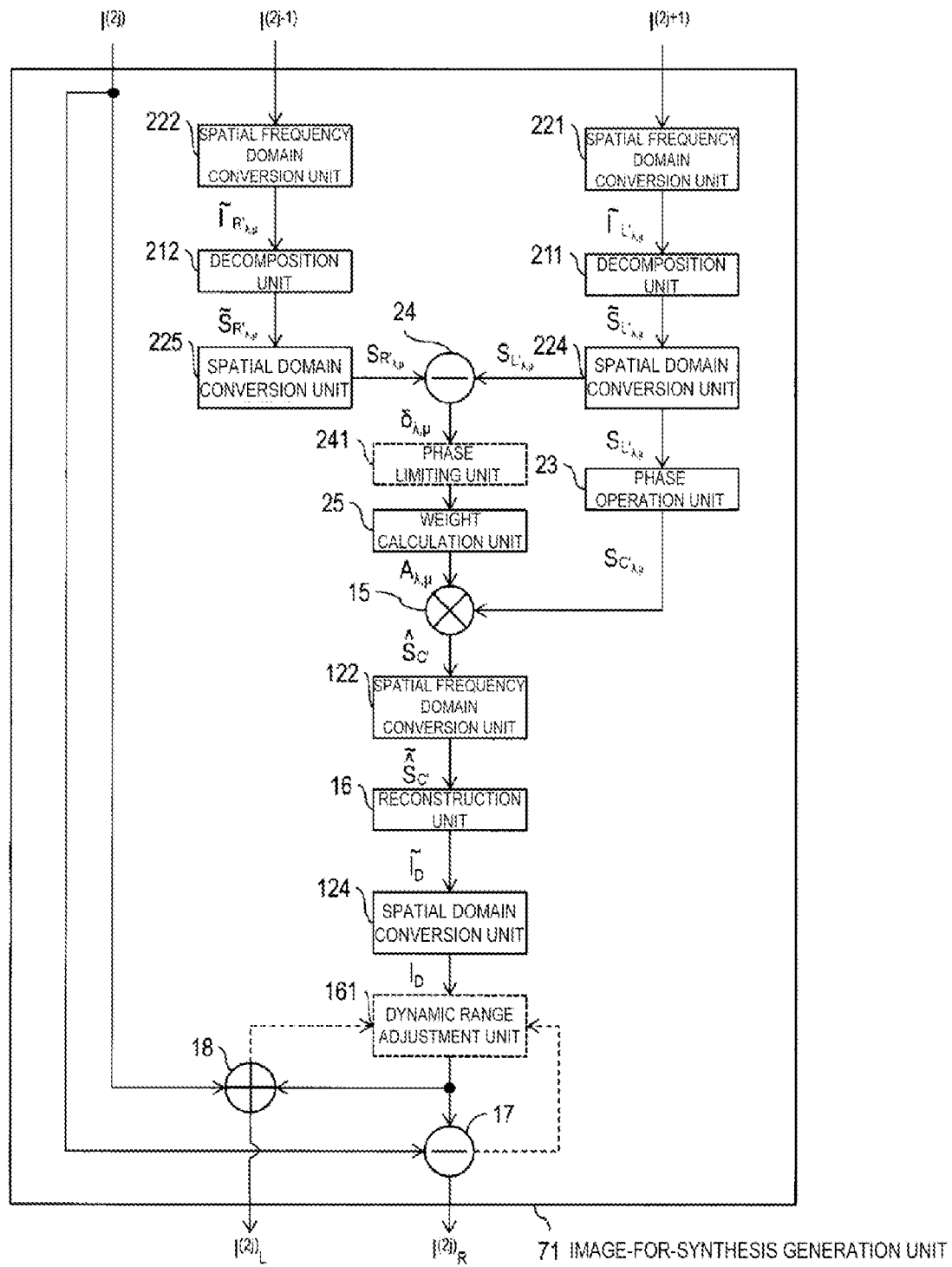
FIG. 24 is a block diagram illustrating a configuration of an image-for-synthesis generation unit 71.

In step S71, the image-for-synthesis generation unit 71 receives the viewpoint image $I^{(j)}$ ($1 \leq j \leq 2J+1$) as an input, generates images for synthesis $I^{(2j)}{}_L$ and $I^{(2j)}{}_R$, from the viewpoint images viewpoint image $I^{(2j-1)}$, $I^{(2j)}$, $I^{(2j+1)}$, for j=1, . . . , J, and outputs the images for synthesis $I^{(2j)}{}_L$ and $I^{(2j)}{}_R$ ($1 \leq j \leq J$). As illustrated in FIG. 24, the configuration of the image-for-synthesis generation unit 71 is the same as the configuration of the image generation unit 20. The difference is that the image generation unit 20 has two input images, whereas the image-for-synthesis generation unit 71 has three input images. Accordingly, the procedure for generating the images for synthesis $I^{(2j)}{}_L$ and $I^{(2j)}{}_R$ is the same as the procedure for generating the added image by the image generation unit 20. In other words, in step S71, the image-for-synthesis generation unit 71 generates a disparity inducing edge $D^{(2j)}$ whose the phase difference from the viewpoint image $I^{(2j)}$ is a predetermined value, from adjacent viewpoint images $I^{(2j-1)}, I^{(2j)}$, and $I^{(2j+1)}$, for j=1, . . . , J, generates an image for synthesis $I^{(2j)}{}_L$ by adding the disparity inducing edge $D^{(2j)}$ to the viewpoint image $I^{(2j)}$, and generates an image for synthesis $I^{(2j)}{}_R$ by adding the polarity-inversed image of the disparity inducing edge $D^{(m)}$ to the viewpoint image $I^{(2j)}$.

In step S52, the output image synthesis unit 52 receives the images for synthesis $I^{(2j)}{}_R$ and $I^{(2j)}{}_L$ ($1 \leq j \leq J$) generated in S71 as an input, synthesizes the output image $Out_j$ from the images for synthesis $I^{(2j)}{}_R$ and $I^{(2j+2)}{}_L$, for j=1, ..., J−1, and outputs the output image $Out_j$ ($1 \leq j \leq J-1$).

In other words, the output image generation unit 70 generates an output image $Out_j$ ($1 \leq j \leq J-1$) from the viewpoint image $I^{(j)}$ ($1 \leq j \leq 2J+1$), and the output image $Out_j$ and the output image $Out_{j+1}$ ($1 \leq j \leq J-2$) includes a phase modulation component that is canceled out when synthesized and visually recognized (simultaneously viewed).

The image generation apparatus 7 may further include a projection unit (not illustrated) that projects the output images $Out_j$ ($1 \leq j \leq J-1$) output in S70. The projection unit arranges the output images $Out_j$ ($1 \leq j \leq J-1$) in the sequence of $Out_1$, $Out_2$, ..., and $Out_{J-1}$, and in other words, in the sequence of the viewpoint positions, and projects the output images on the screen.

Figure 25:
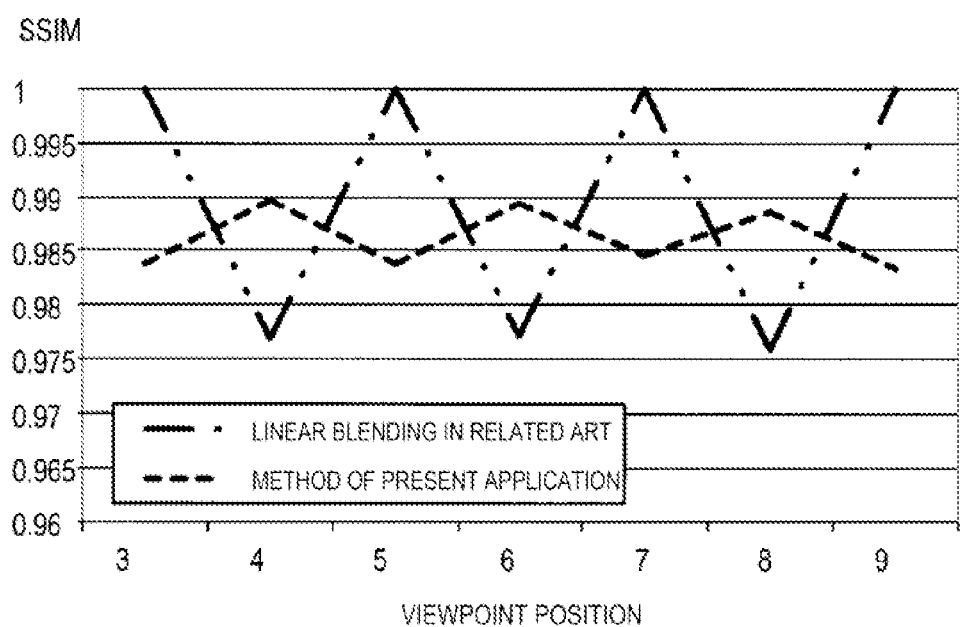
FIG. 25 is a diagram illustrating a result of an experiment.

FIG. 25 illustrates a result of an experiment. The vertical axis represents the value of the image quality evaluation index structural similarity (SSIM). The horizontal axis represents the viewpoint position of the viewpoint image used in FIG. 23. In the linear blending in the related art, at the viewpoint positions 3, 5, 7, and 9, the viewpoint image is directly used as the output image, so that the SSIM at the viewpoint positions 3, 5, 7, and 9 increases, while it can be seen that the SSIM has significantly decreased in the viewpoint positions 4, 6, and 8. On the other hand, in the method of the present disclosure, the SSIM at the viewpoint positions 4, 6, and 8 where no projector is placed is higher than the viewpoint positions 3, 5, 7, and 9 where the projectors are placed. As a result, the fluctuation in image quality associated with the viewpoint movement is reduced, and the viewer is less likely to feel unpleasant feelings.

According to the disclosure of the present embodiment, it is possible to suppress unpleasant feelings associated with fluctuation in image quality caused by the viewer's viewpoint movement.

Others

Some of the above embodiments use the disparity map as in the first embodiment, for example. In the embodiments using the disparity map, a depth map may be used instead of the disparity map. For example, when the depth map is input, the processes described in each embodiment may be performed after converting the depth map into the disparity map.

Appendix

Examples of the apparatuses in the present disclosure include, as single hardware entities, an input unit to which a keyboard or the like can be connected, an output unit to which a liquid crystal display or the like can be connected, a communication device (for example, a communication cable) that can communicate outside the hardware entity, a Central Processing Unit (CPU) (a cache memory or a register may be provided), a RAM and a ROM as memories, an external storage device as a hard disk, and a bus connected to the input unit, the output unit, the communication unit, the CPU, the RAM, the ROM, and the external storage device such that data can be exchanged. If necessary, the hardware entity may be provided with a device (drive) that can read and write data from and to a recording medium such as a CD-ROM. A physical entity having such hardware resources includes a general-purpose computer.

The external storage device of the hardware entity include a program necessary for realizing the above-described functions, data necessary for processing of the program, and or the like (without being limited to the external storage device, for example, the program may be read and stored in a ROM that is a dedicated storage device). Data obtained by the processing of these programs is appropriately stored in a RAM, an external storage device, or the like.

In the hardware entities, each program stored in an external storage device (or ROM or the like) and data necessary for processing of each program are read into a memory as needed, and interpreted, executed and processed by the CPU as appropriate. As a result, the CPU realizes a predetermined function (each component represented as . . . unit, . . . means, or the like described above).

The present disclosure is not limited to the embodiments described above, and may be changed as appropriate without departing from the scope of the disclosure. Further, the processing described in the above embodiment may be performed not only in chronological order according to the order of description, but also in parallel or individually according to the processing capability of the apparatus that executes the processing or as necessary.

As described above, when the processing function of the hardware entity (the apparatus in the present disclosure) described in the above embodiment is implemented by a computer, the processing content of the function that the hardware entity should have is described by a program. By executing this program on a computer, the processing functions of the hardware entity are realized on the computer.

A program describing this processing content can be recorded on a computer-readable recording medium. The computer-readable recording medium may be any recording medium such as a magnetic recording device, an optical disk, a magneto-optical recording medium, and a semiconductor memory. Specifically, for example, a hard disk device, a flexible disk, a magnetic tape, or the like can be used as a magnetic recording device, a Digital Versatile Disc (DVD), a DVD-Random Access Memory (RAM), a Compact Disc Read Only Memory (CD-ROM), a Recordable (CD-R)/ReWritable (RW), or the like can be used as an optical disk, a Magneto-Optical disc (MO), or the like is used as a magneto-optical recording medium, and an Electronically Erasable and Programmable-Read Only Memory (EEP-ROM), or the like can be used as a semiconductor memory.

Further, the distribution of the program is performed, for example, by selling, transferring, lending, or the like, a portable recording medium such as a DVD or a CD-ROM on which the program is recorded. Further, the program may be stored in a storage device of a server computer, and the program may be distributed by transferring the program from the server computer to another computer via a network.

A computer that executes such a program first stores, for example, a program recorded on a portable recording medium or a program transferred from a server computer in its own storage device. Then, when executing the process, the computer reads the program stored in its own recording medium and executes the process according to the read program. Further, as another execution form of the program, the computer may directly read the program from the portable recording medium and execute processing according to the program, and further, may sequentially execute the processing according to the received program, each time the program is transferred Further, the above-described processing may be executed by a so-called an Application Service Provider (ASP) type service that realizes a processing function only by executing an instruction and acquiring a result without transferring a program from the server computer to the computer. It should be noted that the program in the present disclosure includes information which is provided for processing by an electronic computer and is similar to the program (data that is not a direct command to the computer but has characteristics that define the processing of the computer).

Further, in this embodiment, a hardware entity is configured by executing a predetermined program on a computer. However, at least a part of these processing contents may be realized by hardware.

The invention claimed is:

1. A computer-implemented method for generating an image at a viewpoint, the method comprising:

receiving a first viewpoint image and a plurality of disparity maps, wherein the disparity map corresponds to the first viewpoint image;

generating, based on the first viewpoint image and the disparity map, a plurality of disparity inducing edges, wherein each of the plurality of disparity inducing edges has a distinct predetermined phase difference based on the first viewpoint image and a predetermined sequence;

generating, based on the plurality of disparity inducing edges and the first viewpoint image, a first set of pseudo viewpoint images;

generating, based on polarity-inverted images associated with the plurality of disparity inducing edges and the first viewpoint image, a second set of pseudo viewpoint images;

generating, based at least on the first set of pseudo viewpoint images and the second set of pseudo viewpoint images, a set of output images, wherein the set of output images are in the predetermined sequence, and wherein the set of output images include a plurality of phase modulations for canceling out upon a synthesis and visual confirmation; and providing the set of output images.

2. The computer-implemented method of claim 1, the method comprising:

receiving a second viewpoint image, wherein a first viewpoint of the first viewpoint image is adjacent to a second viewpoint of the second viewpoint image; and generating, based on the first viewpoint image, the second viewpoint image, and the disparity map, the plurality of disparity inducing edges, wherein each of the plurality of disparity inducing edges has the distinct predetermined phase difference based on the first viewpoint image and a predetermined sequence.

3. The computer-implemented method of claim 1, the method further comprising:

receiving a set of viewpoint images and a set of disparity maps, wherein the set of viewpoint images are in a sequence of a set of viewpoint positions, and wherein each of the set of disparity maps corresponds to one of the set of viewpoint images; and generating, based at least on the set of viewpoint images and the set of disparity maps, the set of output images.

4. The computer-implemented method of claim 1, the method further comprising:

generating, based on a set of viewpoint images, the set of output images, wherein the set of viewpoint images relates to in a predetermined sequence of viewpoint positions.

5. The computer-implemented method of claim 3, wherein a first number of output images in the set of output images is based on a second number of the viewpoint images in the set of viewpoint images, wherein the first number is less than a half of the second number, and wherein the second number corresponds to a third number of viewpoint positions.

6. The computer-implemented method of claim 1, the method comprising:

aggregating luminance of at least two adjacent images of a combination of the first set of pseudo viewpoint image and the received viewpoint image, and wherein the at least two adjacent images corresponds to at least two adjacent viewpoints; and providing the aggregated luminance of the at least two adjacent images as an image at a view located at an intermediate position of the at least two adjacent viewpoints.

7. The computer-implemented method of claim 3, the method comprising:

aggregating luminance of at least two adjacent images of a combination of the first set of pseudo viewpoint image and the received viewpoint image, and wherein the at least two adjacent images corresponds to at least two adjacent viewpoints; and providing the aggregated luminance of the at least two adjacent images as an image at a view located at an intermediate position of the at least two adjacent viewpoints.

8. A system for generating an image at a viewpoint, the system comprises:

a processor; and a memory storing computer-executable instructions that when executed by the processor cause the system to:

receive a first viewpoint image and a plurality of disparity maps, wherein the disparity map corresponds to the first viewpoint image;

generate, based on the first viewpoint image and the disparity map, a plurality of disparity inducing edges, wherein each of the plurality of disparity inducing edges has a distinct predetermined phase difference based on the first viewpoint image and a predetermined sequence;

generate, based on the plurality of disparity inducing edges and the first viewpoint image, a first set of pseudo viewpoint images;

generate, based on polarity-inverted images associated with the plurality of disparity inducing edges and the first viewpoint image, a second set of pseudo viewpoint images;

generate, based at least on the first set of pseudo viewpoint images and the second set of pseudo viewpoint images, a set of output images, wherein the set of output images are in the predetermined sequence, and wherein the set of output images include a plurality of phase modulations for canceling out upon a synthesis and visual confirmation; and provide the set of output images.

9. The system of claim 8, the computer-executable instructions when executed further causing the system to:
receive a second viewpoint image, wherein a first viewpoint of the first viewpoint image is adjacent to a second viewpoint of the second viewpoint image; and
generate, based on the first viewpoint image, the second viewpoint image, and the disparity map, the plurality of disparity inducing edges, wherein each of the plurality of disparity inducing edges has the distinct predetermined phase difference based on the first viewpoint image and a predetermined sequence.

10. The system of claim 8, the computer-executable instructions when executed further causing the system to:
receive a set of viewpoint images and a set of disparity maps, wherein the set of viewpoint images are in a sequence of a set of viewpoint positions, and wherein each of the set of disparity maps corresponds to one of the set of viewpoint images; and
generate, based at least on the set of viewpoint images and the set of disparity maps, the set of output images.

11. The system of claim 8, the computer-executable instructions when executed further causing the system to:
generate, based on a set of viewpoint images, the set of output images, wherein the set of viewpoint images relates to in a predetermined sequence of viewpoint positions.

12. The system of claim 10, wherein a first number of output images in the set of output images is based on a second number of the viewpoint images in the set of viewpoint images, wherein the first number is less than a half of the second number, and wherein the second number corresponds to a third number of viewpoint positions.

13. The system of claim 8, the computer-executable instructions when executed further causing the system to:
aggregate luminance of at least two adjacent images of a combination of the first set of pseudo viewpoint image and the received viewpoint image, and wherein the at least two adjacent images corresponds to at least two adjacent viewpoints; and
provide the aggregated luminance of the at least two adjacent images as an image at a view located at an intermediate position of the at least two adjacent viewpoints.

14. The system of claim 10, the computer-executable instructions when executed further causing the system to:
aggregate luminance of at least two adjacent images of a combination of the first set of pseudo viewpoint image and the received viewpoint image, and wherein the at least two adjacent images corresponds to at least two adjacent viewpoints; and
provide the aggregated luminance of the at least two adjacent images as an image at a view located at an intermediate position of the at least two adjacent viewpoints.

15. A computer-readable non-transitory recording medium storing computer-executable instructions that when executed by a processor cause a computer system to:
receive a first viewpoint image and a plurality of disparity maps, wherein the disparity map corresponds to the first viewpoint image;
generate, based on the first viewpoint image and the disparity map, a plurality of disparity inducing edges, wherein each of the plurality of disparity inducing edges has a distinct predetermined phase difference based on the first viewpoint image and a predetermined sequence;
generate, based on the plurality of disparity inducing edges and the first viewpoint image, a first set of pseudo viewpoint images;
generate, based on polarity-inverted images associated with the plurality of disparity inducing edges and the first viewpoint image, a second set of pseudo viewpoint images;
generate, based at least on the first set of pseudo viewpoint images and the second set of pseudo viewpoint images, a set of output images, wherein the set of output images are in the predetermined sequence, and wherein the set of output images include a plurality of phase modulations for canceling out upon a synthesis and visual confirmation; and
provide the set of output images.

16. The computer-readable non-transitory recording medium of claim 15, the computer-executable instructions when executed further causing the system to:
receive a second viewpoint image, wherein a first viewpoint of the first viewpoint image is adjacent to a second viewpoint of the second viewpoint image; and
generate, based on the first viewpoint image, the second viewpoint image, and the disparity map, the plurality of disparity inducing edges, wherein each of the plurality of disparity inducing edges has the distinct predetermined phase difference based on the first viewpoint image and a predetermined sequence.

17. The computer-readable non-transitory recording medium of claim 15, the computer-executable instructions when executed further causing the system to:
receive a set of viewpoint images and a set of disparity maps, wherein the set of viewpoint images are in a sequence of a set of viewpoint positions, and wherein each of the set of disparity maps corresponds to one of the set of viewpoint images; and
generate, based at least on the set of viewpoint images and the set of disparity maps, the set of output images.

18. The computer-readable non-transitory recording medium of claim 15, the computer-executable instructions when executed further causing the system to:
generate, based on a set of viewpoint images, the set of output images, wherein the set of viewpoint images relates to in a predetermined sequence of viewpoint positions.

19. The computer-readable non-transitory recording medium of claim 17,
wherein a first number of output images in the set of output images is based on a second number of the viewpoint images in the set of viewpoint images, wherein the first number is less than a half of the second number, and wherein the second number corresponds to a third number of viewpoint positions, the computer-executable instructions when executed further causing the system to:
aggregating luminance of at least two adjacent images of a combination of the first set of pseudo viewpoint image and the received viewpoint image, and wherein the at least two adjacent images corresponds to at least two adjacent viewpoints; and
providing the aggregated luminance of the at least two adjacent images as an image at a view located at an intermediate position of the at least two adjacent viewpoints.

20. The computer-readable non-transitory recording medium of claim 15, the computer-executable instructions when executed further causing the system to:
- aggregate luminance of at least two adjacent images of a combination of the first set of pseudo viewpoint image and the received viewpoint image, and wherein the at least two adjacent images corresponds to at least two adjacent viewpoints; and
- provide the aggregated luminance of the at least two adjacent images as an image at a view located at an intermediate position of the at least two adjacent viewpoints.

* * * * *